(12) United States Patent
Nakano et al.

(10) Patent No.: US 8,705,806 B2
(45) Date of Patent: Apr. 22, 2014

(54) OBJECT IDENTIFICATION APPARATUS AND CONTROL METHOD THEREOF

(75) Inventors: Shunsuke Nakano, Kawasaki (JP); Hiroshi Sato, Kawasaki (JP); Katsuhiko Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 395 days.

(21) Appl. No.: 12/973,172

(22) Filed: Dec. 20, 2010

(65) Prior Publication Data

US 2011/0158536 A1 Jun. 30, 2011

(30) Foreign Application Priority Data

Dec. 28, 2009 (JP) ................. 2009-298819

(51) Int. Cl.
*G06K 9/00* (2006.01)
*G06K 9/62* (2006.01)
*G06K 9/66* (2006.01)

(52) U.S. Cl.
USPC .......................... 382/115; 382/159; 382/195

(58) Field of Classification Search
None
See application file for complete search history.

(56) References Cited

U.S. PATENT DOCUMENTS

| | | | |
|---|---|---|---|
| 6,463,176 B1 | 10/2002 | Matsugu et al. | |
| 7,054,850 B2 | 5/2006 | Matsugu | |
| 7,532,745 B2 | 5/2009 | Inoue | |
| 2003/0103652 A1* | 6/2003 | Lee et al. | 382/118 |
| 2003/0198368 A1* | 10/2003 | Kee | 382/118 |
| 2007/0242861 A1* | 10/2007 | Misawa et al. | 382/118 |
| 2008/0130960 A1* | 6/2008 | Yagnik | 382/118 |
| 2008/0232650 A1* | 9/2008 | Suzuki et al. | 382/118 |

FOREIGN PATENT DOCUMENTS

| | | |
|---|---|---|
| JP | 3078166 B2 | 8/2000 |
| JP | 2001-101418 | 4/2001 |
| JP | 2002008032 A | 1/2002 |
| JP | 2003323622 A | 11/2003 |
| JP | 2009-87209 | 4/2009 |

OTHER PUBLICATIONS

T. Ahonen, A. Hadid, M. Pietikainen, (2004) "Face Recognition with Local Binary Patterns", Proc. of 8th European Conference on Computer Vision, ser. Lecture Notes in Computer Science, vol. 3021.

Shen, L., Bai, L., Bardsley, D., Wang, Y., "Gabor Feature selection for Face Recognition using Improved AdaBoost Learning". Proceedings of International Workshop on Biometric Recognition System, in conjunction with ICCV'05, 2005.

(Continued)

*Primary Examiner* — Barry Drennan
*Assistant Examiner* — David F Dunphy
(74) *Attorney, Agent, or Firm* — Fitzpatrick, Cella, Harper & Scinto

(57) ABSTRACT

An object identification apparatus, which identifies a class of a plurality of registered classes to which an object included in an input image belongs, registers a plurality of registered images used in identification of an input image, and holds designation data required to designate partial areas used in identification. The apparatus extracts feature amounts of the partial areas designated by the designation data from the input image and each of the plurality of registered images, and identifies a class to which the input image belongs based on the extracted feature amounts. The apparatus determines based on the plurality of registered images whether or not is required to update processing contents of an identification unit. When it is determined that the processing contents are required to be updated, the apparatus updates the designation data based on registered images.

16 Claims, 13 Drawing Sheets

(56) References Cited

OTHER PUBLICATIONS

Glenn Fung, O.L. Mangasarian, "Incremental Support Vector Machine Classification", Proceedings of Second SIAM International Conference on Data Mining, 2002.

P. Viola and M. Jones (2001) "Rapid Object Detection using a Boosted Cascade of Simple Features", Computer Vision and Pattern Recognition.

Burges, C.J.C (1996). "Simplified Support Vector Decision Rules." International Conference on Machine Learning. (pp. 71-77).

G. Cauwenberghs and T. Poggio (2001) "Incremental and Decremental Support Vector Machine Learning", In Advances in Neural Information Processing Systems.

Japanese Office Action dated Sep. 30, 2013, issued during prosecution of related Japanese application No. 2009-298819.

* cited by examiner

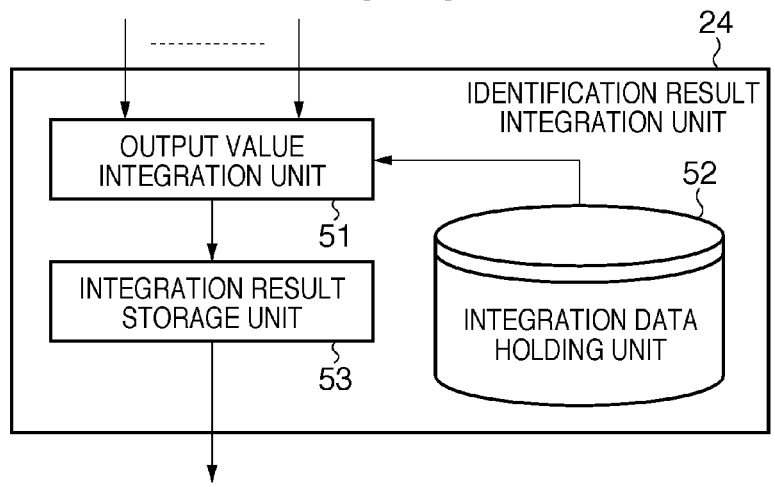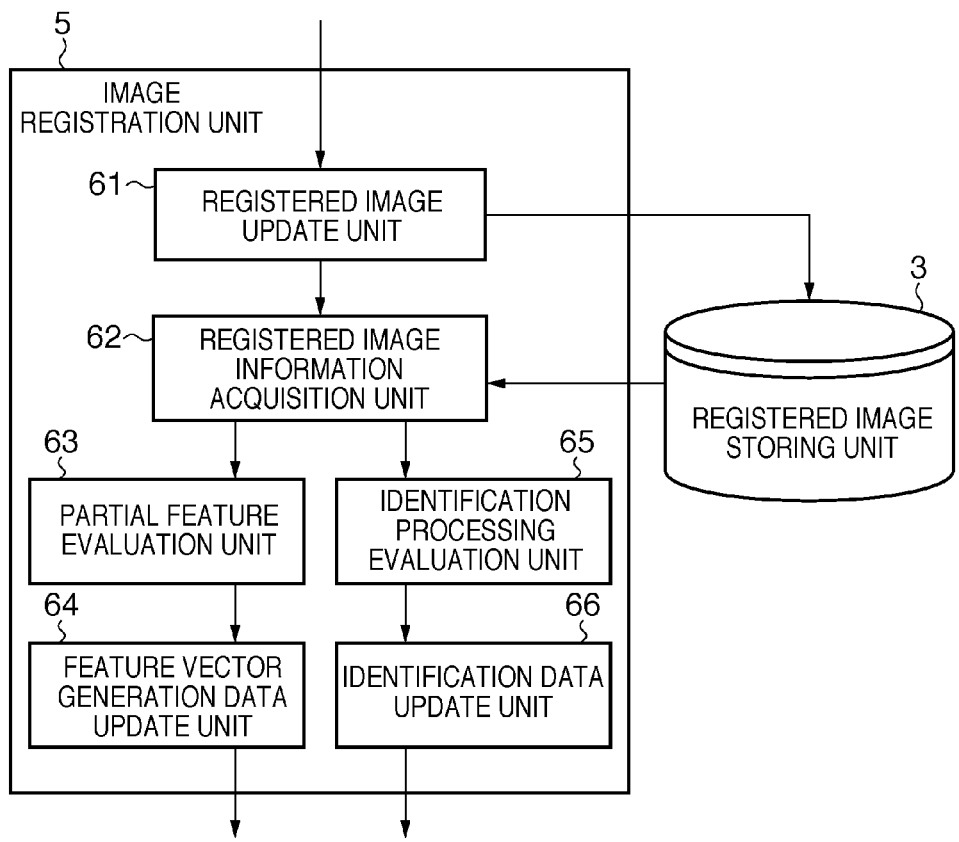

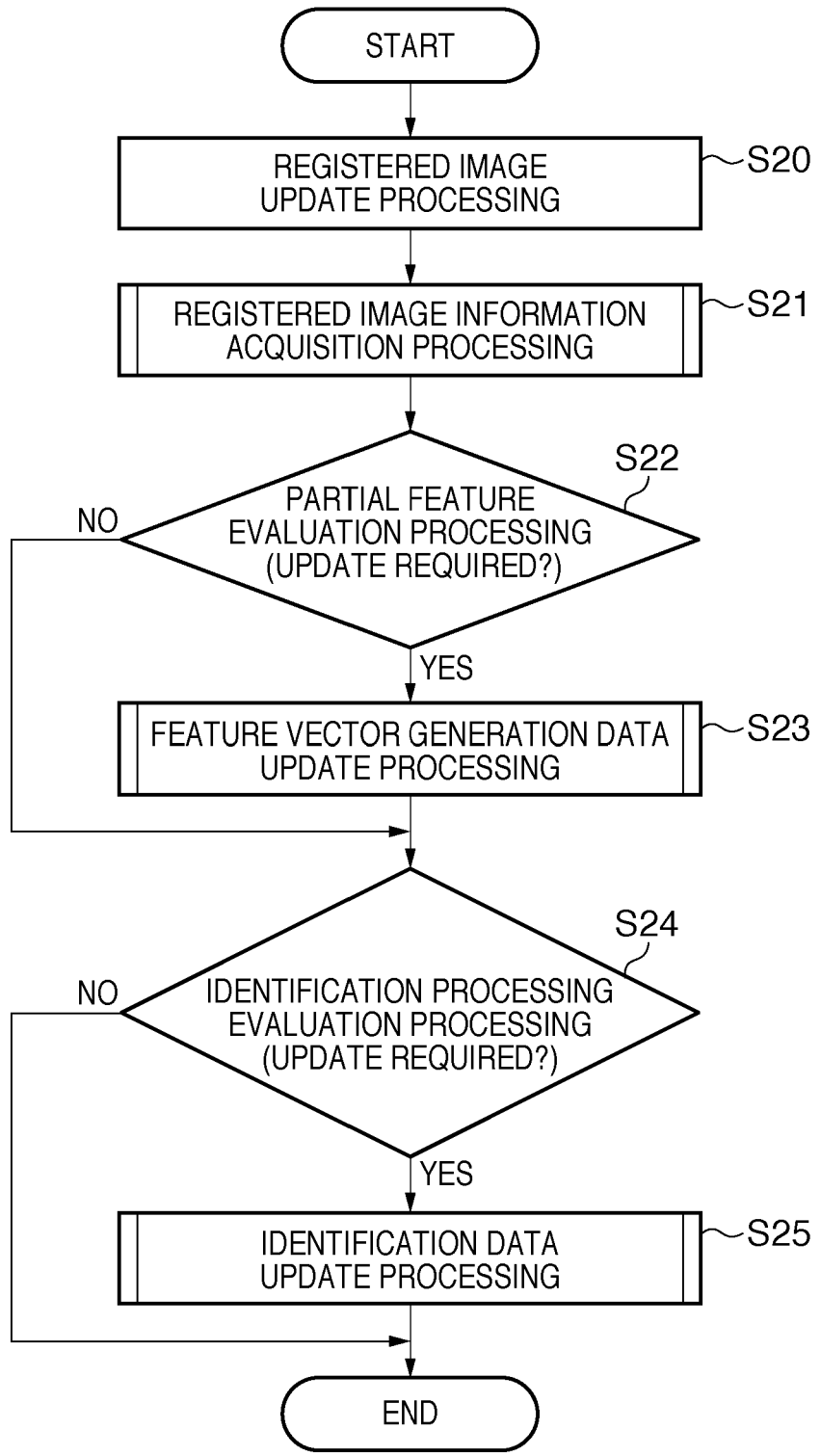

OBJECT IDENTIFICATION APPARATUS AND CONTROL METHOD THEREOF

BACKGROUND OF THE INVENTION

1. Field of the Invention

The present invention relates to an object identification apparatus which identifies a class to which input data belongs, and a control method thereof.

2. Description of the Related Art

Many techniques for identifying a class which is registered in advance and to which an object in input data belongs by comparing the input data with data which are registered in advance have been proposed. As an application field of these techniques, a face identification technique that identifies an individual face is known. A class in face identification includes a name or ID which can be used to identify an individual, and a registered image is appended in advance with an identifier of that class. Assume that even under various shooting conditions of registered images, registered images including images of an identical person belong to an identical class. In the following description of the present specification, identification of objects means determination of individual differences of objects (for example, personal differences). On the other hand, detection of objects means determination of objects which belong to an identical category without discriminating individuals (for example, detection of faces without discriminating individuals).

As the face identification technique, for example, a method of identifying a face using partial feature amounts of an image is described in Japanese Patent Laid-Open No. 2003-323622 (to be referred to as patent reference 1 hereinafter). In the method described in patent reference 1, partial feature amounts are extracted from some characteristic partial areas in an input image, and partial feature amounts are also extracted from partial areas corresponding to those of the input image in each registered image at the same time. Then, similarities obtained by comparing corresponding feature amounts between the input image and each registered image are integrated to obtain a similarity between the input image and that registered image. Finally, a class to which a registered image having the largest similarity with this input image belongs is determined as that corresponding to the input image.

The aforementioned partial areas required to calculate partial feature amounts can be calculated in advance by a method such as the AdaBoost method used in, for example, [Shen, L., Bai, L., Bardsley, D., Wang, Y., Gabor feature selection for face recognition using improved adaboost learning. Proceedings of International Workshop on Biometric Recognition System, in conjunction with ICCV'05, 2005] (to be referred as non-patent reference 1 hereinafter). On the other hand, for this prior learning, a sequential learning method for improving the recognition performance while sequentially adding supervisory data during operation of recognition processing, as described in [Glenn Fung, O. L. Mangasarian, Incremental support vector machine classification, Proceedings of Second SIAM International Conference on Data Mining, 2002.] (to be referred to as non-patent reference 2 hereinafter) is popularly used not only in image processing but also in a variety of fields.

In the face identification method using partial areas, typically, the positions and number of partial areas are determined in advance so as to enhance average identification performance for every identification targets. However, for example, when only targets which belong to a few specific classes are to be accurately identified, the average identification performance does not suffice. Also, the sequential learning method described in non-patent reference 2 aims at improving identification performance for specific targets by sequentially adding data of targets for which the identification performance is to be improved as supervisory data. However, an identification unit acquired by sequential learning tends to be excessively optimized to data given as supervisory data. For this reason, by repeating the sequential learning, the identification performance for targets other than the specific targets is extremely worsened, that is, over-learning occurs.

SUMMARY OF THE INVENTION

The present invention has been made in consideration of the aforementioned problems, and one embodiment of the present invention provides an object identification apparatus and control method thereof, which improves identification performance for a specific object to be identified while suppressing deterioration of the identification performance caused by over-learning which may occur upon updating a sequential learning type identification unit.

According to one aspect of the present invention, there is provided an object identification apparatus which identifies a class of a plurality of registered classes to which an object included in an input image belongs, comprising: a registration unit configured to register in a storage unit a plurality of registered images used in identification of an input image; a holding unit configured to hold designation data required to designate partial areas used in identification; an identification unit configured to extract feature amounts of the partial areas designated by the designation data from the input image and each of the plurality of registered images, and to identify a class to which the input image belongs based on the extracted feature amounts; a registration update unit configured to update registered contents in the storage unit; an update determination unit configured to determine based on the plurality of registered images registered in the registration unit whether or not to require to update processing contents of the identification unit; and a content update unit configured to update, when the update determination unit determines that the processing contents are required to be updated, the designation data held by the holding unit based on registered images registered in the storage unit.

Also, according to another aspect of the present invention, there is provided a control method of an object identification apparatus, which comprises: a storage unit configured to store a plurality of registered images used in identification of an input image; and a holding unit configured to hold designation data required to designate partial areas used in identification, and which identifies a class of a plurality of registered classes to which an object included in an input image belongs, the control method comprising: an identification step of extracting feature amounts of the partial areas designated by the designation data from the input image and each of the plurality of registered images, and identifying a class to which the input image belongs based on the extracted feature amounts; a registration update step of updating registered contents in the storage unit; an update determination step of determining based on the plurality of registered images registered in the storage unit whether or not to require to update processing contents of the identification step; and an update step of updating, when it is determined in the update determination step that the processing contents are required to be updated, the designation data based on registered images registered in the storage unit.

Further features of the present invention will become apparent from the following description of exemplary embodiments with reference to the attached drawings.

BRIEF DESCRIPTION OF THE DRAWINGS

FIG. 8 is a block diagram showing an arrangement example of an identification result integration unit;

FIG. 9 is a block diagram showing an arrangement example of an image registration unit;

FIG. 10 is a flowchart showing an example of processing executed by the image registration unit;

DESCRIPTION OF THE EMBODIMENTS

First Embodiment

Figure 1A:
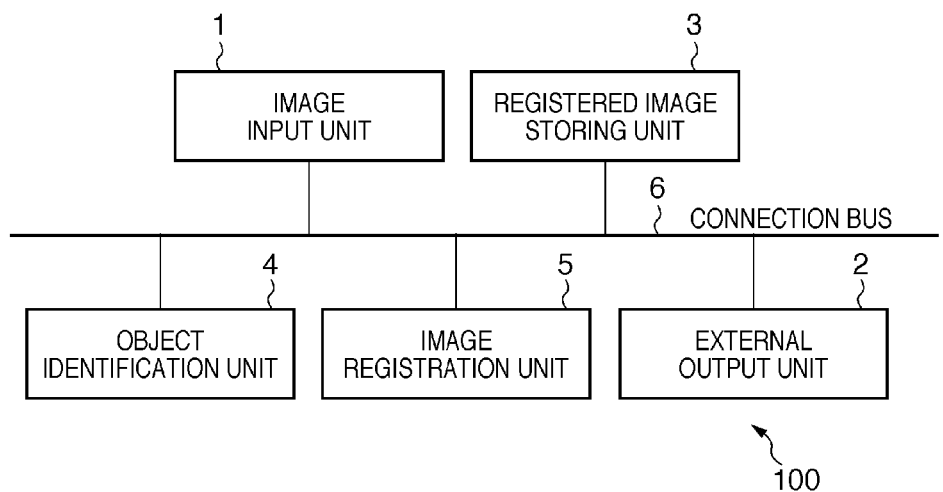
FIGS. 1A and 1B are block diagrams showing arrangement examples of an object identification apparatus according to embodiments.

Embodiments of the present invention will be described in detail hereinafter with reference to the drawings. FIG. 1A is a block diagram showing an arrangement example of an object identification apparatus 100 according to the first embodiment. An image input unit 1 which inputs an image can be a device which supplies image data to be identified, and is not limited to a specific device. That is, the image input unit 1 may be an image capturing device including optical lenses and a video sensor, or a semiconductor memory which holds image data to be readable.

An external output unit 2 externally outputs a class corresponding to an input image, as an output of an object identification unit 4, in an appropriate format. Typically, the external output unit 2 is a monitor such as a CRT or TFT liquid crystal display, and displays image data obtained from the image input unit 1. Or the external output unit 2 superimposes the output from the object identification unit 4 on image data. The external output unit 2 may adopt a mode of outputting a result output of the object identification unit 4 as digital data to, for example, an external storage medium, or a mode of printing the result output on a paper medium. Note that the output means is not limited to those described above, and a plurality of means may be simultaneously used.

A registered image storing unit 3 stores and holds image data which is input from the image input unit 1 as a registered image. Typically, the registered image storing unit 3 preferably includes a repetitively rewritable semiconductor memory. The registered image storing unit 3 desirably has a capacity large enough to hold several tens or more image data. However, as another method to be adopted, the registered image storing unit 3 may hold information (for example, feature amounts of images) used by the object identification unit 4, and may not hold image data themselves.

The object identification unit 4 and an image registration unit 5 are respectively implemented by dedicated circuits (ASIC) or processors (reconfigurable processor, DSP, CPU, etc.). Alternatively, the object identification unit 4 and image registration unit 5 may exist in the form of programs to be executed inside a single dedicated circuit and general-purpose circuit (a CPU for a PC). The object identification unit 4 obtains images from the image input unit 1 and registered image storing unit 3, and detects and identifies an object included in an input image. Details of the arrangement and processing of this unit will be described later. The image registration unit 5 executes processing for adding a registered image to the registered image storing unit 3 or processing for deleting or replacing images already stored in the registered image storing unit 3, so as to update the processing contents of the object identification unit 4. Details of the arrangement and processing of this unit will be described later. A connection bus 6 is used to connect the aforementioned units so as to exchange control signals and data.

<Overall Sequence>

Figure 2:
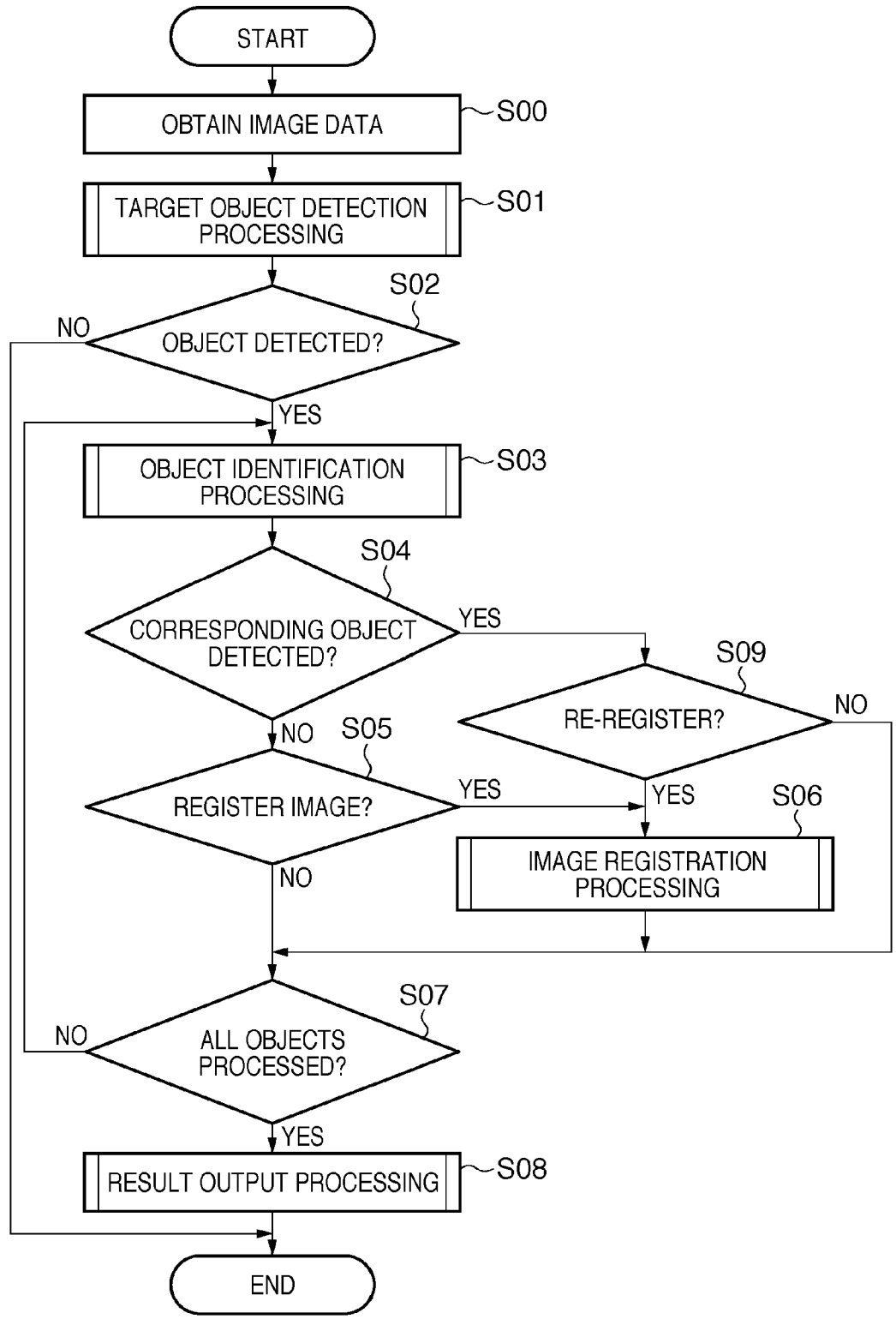
FIG. 2 is a flowchart showing identification processing of an input image by the object identification apparatus of the embodiment.

Actual processing executed when the object identification apparatus 100 identifies an object from an image will be described below with reference to FIG. 2. A case will be described below wherein an object to be identified is a human face. However, the present invention is not limited to this.

Initially, the image input unit 1 obtains image data (S00). The object identification unit 4 applies target object detection processing (human face detection processing in this embodiment) to the obtained image data (S01). As a method of detecting a human face from an image, a known technique can be used. For example, techniques proposed by Japanese Patent No. 3078166 and Japanese Patent Laid-Open No. 2002-8032 can be used.

After the detection processing of a human face as a target object, if the image includes a human face (YES in step S02), the object identification unit 4 executes individual identification processing (S03). If the image does not include any human face (NO in step S02), this processing ends. Practical processing contents of the object identification processing (S03) will be described in detail later.

The image registration unit 5 determines, based on the object identification processing result, whether or not the input image includes a face that matches a registered person (S04). If the same person as the face detected in the target object detection processing (S01) is included in the registered persons (YES in step S04), the process advances to step S09. The image registration unit 5 determines in step S09 whether or not to re-register the image of the registered person. If the detected face does not match anyone of the registered persons (NO in step S04), the image registration unit 5 determines whether or not to add that person to the registered images (S05). In steps S05 and S09, a method of always registering the person is available. Alternatively, for example, the user may decide whether or not to register the person on sight via an external interface or GUI. If it is determined that the person is to be registered (YES in step S05 or S09), the image registration unit 5 executes object (human face) registration processing (to be described later) (S06). If the person is not registered (NO in step S05 or S09), the process directly advances to step S07. After the image registration processing in step S06, or if it is determined in step S05 or S09 that the person is not registered, the object identification unit 4 determines if the processing is complete for all detected objects (S07). If objects to be processed still remain (NO in step S07), the process returns to step S03. If the processing is complete for all the detected objects (YES in step S07), the object identification unit 4 outputs the results of a series of object identification processes to the external output unit 2 (S08).

Note that in the image registration processing (S06), user's operations may become complicated if the image includes a large number of unregistered faces. Hence, in this case, the processing may be limited to some faces which appear in large sizes in the image. Furthermore, a means for directly transferring an image from the image input unit 1 without the intervention of the sequence shown in FIG. 2 may be provided. That is, the object extraction and identification processes of registered images need not always be executed by this apparatus. Direct registration processing and identification processing at that time may be switched via the aforementioned external interface or GUI.

The processing sequence of the object identification apparatus according to this embodiment has been described. The object identification processing executed in step S03 and the image registration processing executed in step S06 will be described in detail below.

<Object Identification Processing>

The arrangement of the object identification unit 4 will be described first with reference to FIG. 3. A partial feature amount extraction unit 21 extracts corresponding feature amounts from an input image and registered image by applying the same processing to the input image obtained from the image input unit 1 and the registered image obtained from the registered image storing unit 3. A similarity calculation unit 22 calculates a similarity between the corresponding feature amounts of the input image and the registered image, which are obtained by the partial feature amount extraction unit 21. An identification unit 23 judges based on the similarity calculated by the similarity calculation unit 22 whether or not the input image belongs to a class to which the registered image belongs. An identification result integration unit 24 finally judges a class to which the input image belongs using the judgment result of the identification unit 23. The respective processes executed in the object identification unit 4 will be described in detail later.

Figure 4:
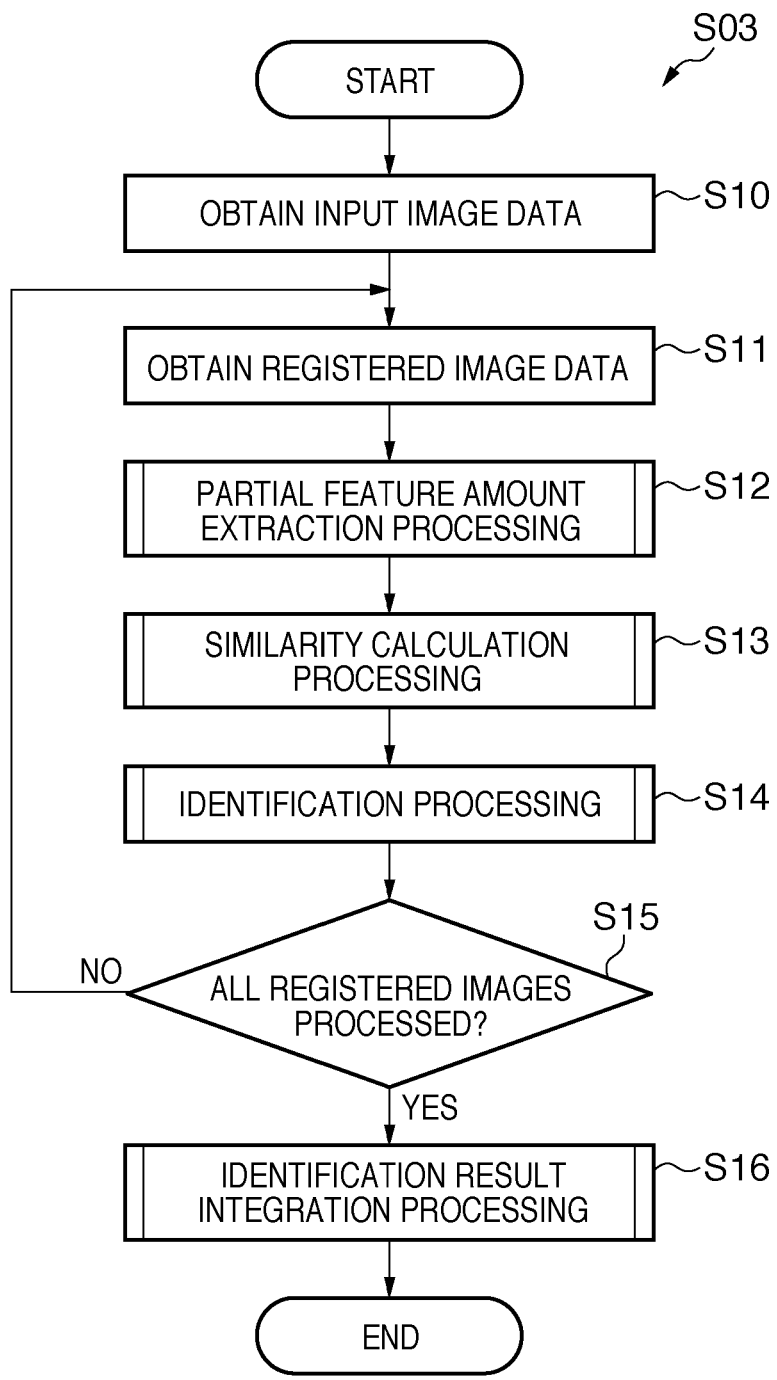
FIG. 4 is a flowchart showing an example of identification processing executed by the object identification unit.

The object identification processing (S03) executed by the object identification unit 4 will be described below with reference to the flowchart shown in FIG. 4. The object identification unit 4 obtains an input image from the image input unit 1 (S10). The object identification unit 4 then obtains one registered image from the registered image storing unit 3 (S11). Subsequently, the partial feature amount extraction unit 21 applies partial feature amount extraction processing to both the images (S12). The similarity calculation unit 22 executes similarity calculation processing for calculating similarity between the two images using the extracted partial feature amounts (S13). Then, the identification unit 23 executes identification processing using the similarity calculated by the similarity calculation unit 22 (S14). As a result of this identification processing, a real value which allows to judge whether or not the input image belongs to a class to which the registered image belongs can be obtained. These processes in steps S12 to S14 will be described in detail later. The object identification unit 4 discriminates whether or not the series of processes from step S11 to step S14 have been executed for all registered images held in the registered image storing unit 3 (S15). If registered images to be processed still remain, the object identification unit 4 repeats the same processes. If the processes are complete for all the registered images, the identification result integration unit 24 classifies the input image to a class to which the registered image corresponding to the largest value obtained in the identification processing belongs, and outputs the classification result to the external output unit 2 as the output of the object identification unit 4 (S16). As an output format, only the best matched registered image and its output value or class identifier may be output. If there is a plurality of registered images, the results for the respective registered images may be output.

<Partial Feature Amount Extraction Processing>

The partial feature amount extraction unit 21 will be described below with reference to FIG. 5. The partial feature amount extraction unit 21 applies the same processing to the input image and registered image, and extracts corresponding partial feature amounts. In this embodiment, when an object is a human face, typically, partial areas of each image, which are extracted as partial feature amounts, and undergo predetermined processing, are extracted as feature vectors. More specifically, the following processing can be executed.

A feature vector extractor 31 detects edge points of components such as eyes, a mouth, and a nose from a face image. As an algorithm for detecting edge points, for example, a method using a convolution neural network described in Japanese Patent No. 3078166 can be used. After the edge points are detected, luminance values of predetermined areas are extracted as feature vectors with reference to the detected edge points. Although the number of areas is arbitrarily determined, typically, the edge points of one portion and several surrounding points are set. The reference edge points required to decide the positions of local areas are selected in advance from portions such as the right and left eyes, the two edge points of a mouth, and nose, which are considered to express individual features. Also, in place of directly obtaining luminance values, feature vectors may be extracted from results of an arbitrary filter calculations using, for example, a Gabor filter or Local Binary Pattern (LBP). Note that as for the LBP, please refer to [T. Ahonen, A. Hadid, M. Pietikainen, (2004) "Face recognition with local binary patterns", Proc. of 8th European Conference on Computer Vision, ser. Lecture Notes in Computer Science, vol. 3021].

Subsequently, a feature vector converter 32 applies predetermined conversion to the feature vectors extracted by the feature vector extractor 31. As the conversion of the feature vectors, for example, a dimension reduction based on principal component analysis (PCA) or that based on independent component analysis (ICA) is executed. Alternatively, a dimension reduction based on Fisher discriminant analysis (FDA) may be executed. When the PCA is used as the feature vector conversion method, parameters such as the number of bases (the number of dimensions to be reduced of feature vectors) and bases to be used are to be set. In place of the number of bases, a sum of eigenvalues corresponding to base vectors, that is, a cumulative proportion may be used as an index. Different parameters and conversion methods may be used for respective partial areas. What kinds of parameters are to be actually set may be obtained from a feature vector generation data holding unit 33 (to be described later). Also, parameters such as the number of partial areas, their positions, weights as their reliabilities, and conversion methods are determined in advance, and can be obtained from the feature vector generation data holding unit 33 (to be described later). That is, the feature vector generation data holding unit 33 holds designation data including designations of feature areas to be used in the identification processing and designations of feature vector conversion methods for them. How to decide these parameters will be described later in the paragraphs of the image registration unit 5.

The feature vector generation data holding unit 33 holds data required to generate feature vectors in the feature vector extractor 31 and feature vector converter 32. More specifically, the feature vector generation data holding unit 33 holds the aforementioned setting information including the positions of the partial areas for the detected edge points (that is, designations of partial areas to be used) and the conversion methods to be applied for respective partial areas, and also the following information required for actual conversion. That is, when the dimension reduction based on the principal component analysis (PCA) is used in the conversion to be executed by the feature vector converter 32, eigenvectors of variance-covariance matrices are included. Also, when the dimension reduction based on the independent component analysis (ICA) is to be executed, base vectors of independent components are included.

Figure 6:
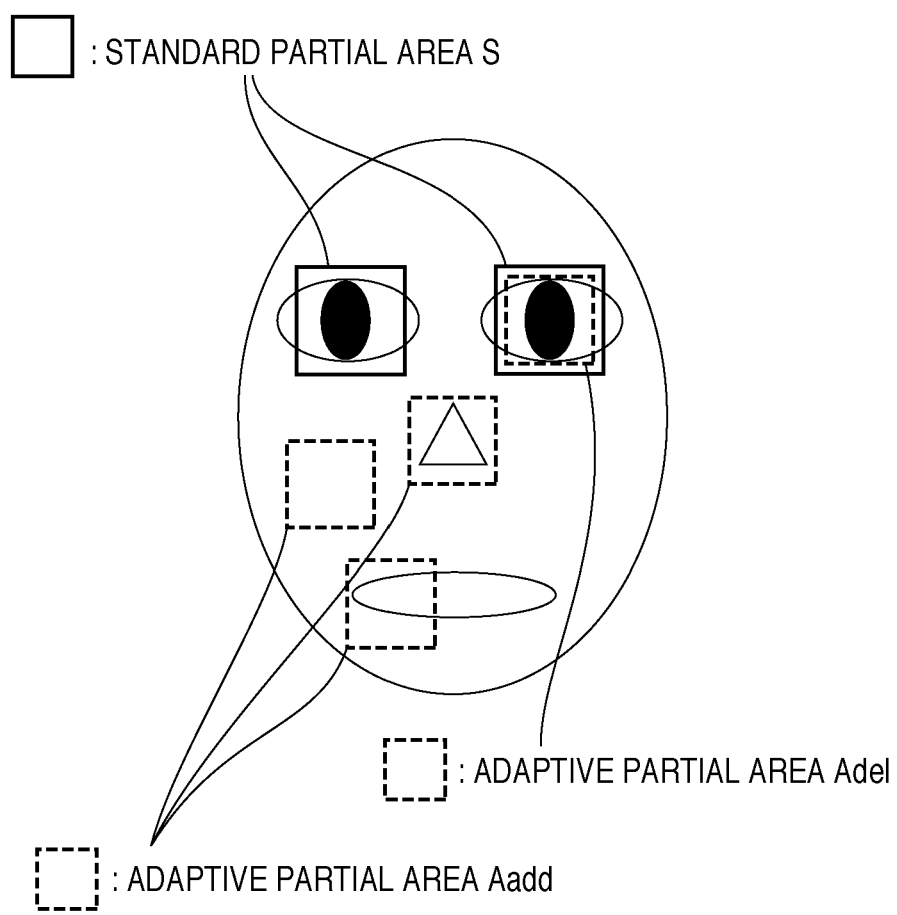
FIG. 6 is a view showing an example of partial areas saved in a feature vector generation data holding unit.

The feature vector generation data holding unit 33 saves roughly two types of partial areas. FIG. 6 shows the types of partial areas. The partial areas include standard partial areas S, which are determined in advance, and adaptive partial areas, which are sequentially calculated based on registered images when the contents of the registered image storing unit 3 are updated by the image registration processing (S06) shown in FIG. 2. Furthermore, the adaptive partial areas include two types of areas. Adaptive partial areas Aadd which do not overlap the standard partial areas are added to the standard partial areas. On the other hand, adaptive partial areas Adel which overlap the standard partial areas are set as partial areas which are not necessary for the standard partial areas which exist at the corresponding positions. A method of setting the standard and adaptive partial areas in practice will be described in detail later in the paragraphs of the image registration unit 5. Note that in order to speed up the aforementioned object identification processing, partial feature amounts which are obtained by applying the partial feature amount extraction processing to registered images in advance may be saved in a storage medium which is prepared separately, and these saved partial feature amounts may be repetitively used.

<Similarity Calculation Processing>

The similarity calculation unit 22 will be described below. In this case, a similarity between the input image and the registered image is defined using the feature vectors extracted from the input image and the registered image and weights for respective partial areas, which are used in the partial feature amount extraction unit 21. Various definitions of similarities are available. In this case, for example, correlation values (inner products) between feature vectors corresponding to identical areas in the registered image and input image are calculated, and a vector including, as components, values obtained by multiplying the correlation values by likelihoods of the corresponding partial areas is defined as a similarity vector. According to this definition, the number of dimensions of the similarity vector matches the number of partial areas.

<Identification Processing>

The identification unit 23 and identification result integration unit 24 will be described below. In this processing, a registered class to which the input image belongs is discriminated using the similarity vectors obtained by the similarity calculation processing. As this method, similarity vectors are classified into two classes, that is, an intra-class which represents a variation between objects that belong to an identical class in images, and an extra-class which represents a variation between objects that belong to different classes. Taking faces as an example, a similarity vector which belongs to the intra-class is that obtained from two images of an identical person, which have different face directions and illumination conditions. On the other hand, a similarity vector which belongs to the extra-class is that obtained from images of two different persons. The identification unit 23 will be described below.

Figure 7A:
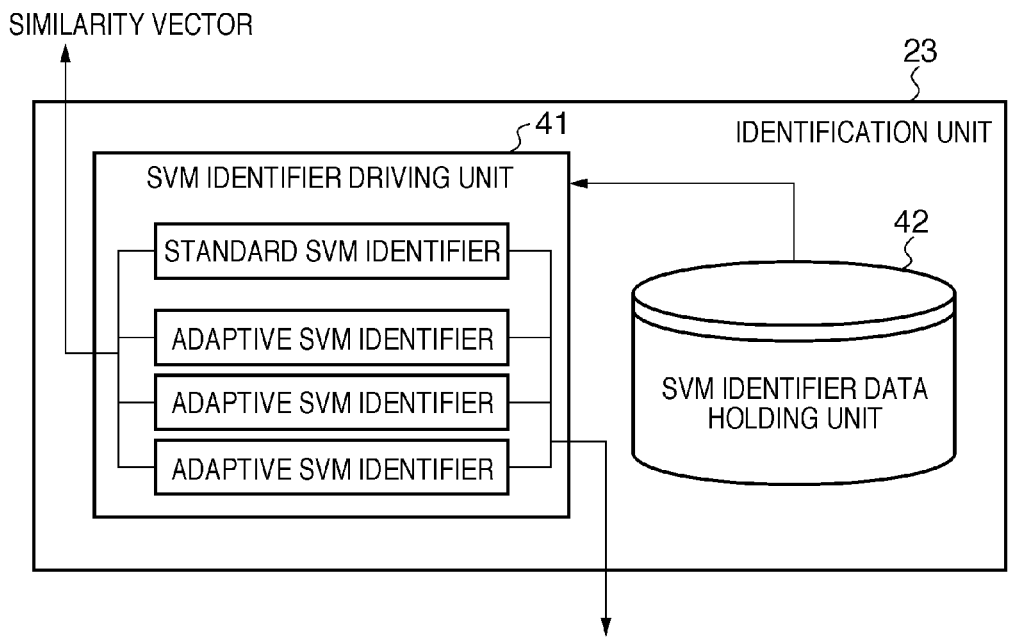
FIGS. 7A and 7B are block diagrams showing arrangement examples of an identification unit.

As an identifier which identifies multivariate amount data into two classes, typically, an identifier such as an SVM identifier may be used. This embodiment will explain a case in which determination is made using an SVM identifier. As shown in FIG. 7A, the identification unit 23 includes an SVM identifier driving unit 41 and SVM identifier data holding unit 42. Also, as shown in FIG. 8, the identification result integration unit 24 includes an output value integration unit 51, integration data holding unit 52, and integration result storage unit 53. The identification unit 23 uses roughly two types of SVM identifiers. The identification unit 23 includes one standard SVM identifier, which has been trained as an identifier which identifies a variation class (intra-class) between objects which belong to an identical class in images, and a variation class (extra-class) between objects which belong to different classes. Furthermore, the identification unit 23 includes adaptive SVM identifiers, as many as the number of registered classes. Each adaptive SVM identifier sequentially learns registered images as supervisory data when the contents of the registered image storing unit 3 in FIG. 1A are updated by the image registration processing (S06) in FIG. 2. The adaptive SVM identifier identifies a variation class (intra-class) between objects which belong to a specific class, and other variation classes. Parameters of these SVM identifiers are stored in the SVM identifier data holding unit 42, and are transferred to the SVM identifier driving unit 41 at the time of the identification processing. Note that a technique associated with identification in SVM is compliant with a known reference, for example, [V. N. Vapnik (1998) "Statistical Learning Theory"], and the like, and a detailed description thereof will not be given. Also, the learning sequence of the adaptive SVM identifiers will be described later in the paragraphs of the image registration unit 5.

The sequence for identifying a similarity vector between the input image and the registered image is as follows. The SVM identifier driving unit 41 inputs only components corresponding to the standard partial areas S in FIG. 6, as well as those which include the unnecessary adaptive partial areas and those which do not, to the standard SVM identifier. Parallelly, the SVM identifier driving unit 41 inputs some components of a similarity vector to the adaptive SVM identifier. The components of the similarity vector, which are input to the adaptive SVM identifier, include those of the similarity vector corresponding to the adaptive partial areas Aadd to be added and the standard partial areas S except for the unnecessary adaptive partial areas Adel in FIG. 6. Each of the two identifiers outputs one real value that allows to judge whether or not the similarity vector belongs to the intra-class. Next, the two real values are input to the identification result integration unit 24. The output value integration unit 51 of the identification result integration unit 24 adds the real values obtained from the identification unit 23 after these values are respectively multiplied by weights set by the image registration unit 5, defines the sum as a final output value, and holds it in the integration result storage unit 53. Note that the output value integration unit 51 of this embodiment integrates the outputs of the two SVM identifiers as a linear sum. However, as for this method, a function may be separately prepared. Note that the method of training the standard and adaptive SVM identifiers and the sequence for deciding weights used to integrate their outputs will be described in detail later in the description of the image registration unit 5.

As the value obtained by the SVM identifier driving unit 41 is larger, the input image is more likely to belong to a class to which the registered image belongs, but it is merely a criterion of judgment. Hence, after completion of the identification processing for all the registered images, the identification result integration unit 24 determines, as the class of the input image, a class to which the registered image corresponding to the largest integrated output value, which is held in the integration result storage unit 53, belongs. Alternatively, if the maximum value obtained by the SVM identifier driving unit 41 is smaller than a certain threshold, the identification result integration unit 24 judges that the input image does not belong to any of the classes, and outputs that message to the external output unit 2. The value of this threshold may be arbitrarily set. However, if this value is too large, it is discriminated that many input images that should belong to one of the registered classes do not belong to any of the registered classes. Also, if this value is too small, it is discriminated that an input image which does not belong to any of the registered classes belongs to one of the registered classes. This threshold can be determined in advance by repeating adjustments, or the user may be allowed to set this threshold.

In general, when the number of partial areas is increased, the number of dimensions of the similarity vector increases accordingly, and a calculation time is prolonged. In order to suppress the SVM calculation time, an algorithm for reducing the number of support vectors is applied to shorten the calculation time to some extent. Since a method of reducing the number of support vectors is a known technique as described in [Burges, C. J. C (1996). "Simplified support vector decision rules." International Conference on Machine Training (pp. 71-77).], a description thereof will not be given. The object identification processing has been described. The image registration processing (S06) in FIG. 2 will be described in detail below.

<Image Registration Unit 5>

The image registration unit 5 and its processing will be described below. The arrangement of the image registration unit 5 will be described first with reference to FIG. 9. A registered image update unit 61 updates the registered contents in the registered image storing unit 3 (registration update processing). That is, the registered image update unit 61 executes addition of a new registered image, deletion and replacement of the existing registered images for the registered image storing unit 3. A registered image information acquisition unit 62 extracts or calculates various kinds of information of images saved in the registered image storing unit 3. A partial feature evaluation unit 63 and identification processing evaluation unit 65 respectively execute update determinations of feature vector generation data and identification data. The partial feature evaluation unit 63 executes the update determination for judging, based on the information obtained by the registered image information acquisition unit 62, whether or not is required to update partial areas. If it is judged in this update determination that the partial areas are required to be updated, a feature vector generation data update unit 64 selects adaptive partial areas using the information obtained from the registered image information acquisition unit 62, and updates the contents of the feature vector generation data holding unit 33 in the partial feature amount extraction unit 21 (first update processing). Likewise, the identification processing evaluation unit 65 judges, based on the information obtained by the registered image information acquisition unit 62, whether or not is required to update the identification unit 23. If it is judged that the identification unit 23 is required to be updated, an identification data update unit 66 re-sets parameters of the adaptive SVM identifiers using the information obtained from the registered image information acquisition unit 62, thereby updating the contents of the SVM identifier data holding unit 42 (second update processing). Also, the identification processing evaluation unit 65 judges, based on the information obtained by the registered image information acquisition unit 62, whether or not is required to update the contents of the identification result integration unit 24. If it is judged that the identification result integration unit 24 is required to be updated, the identification data update unit 66 re-sets parameters in the integration data holding unit 52 using the information obtained from the registered image information acquisition unit 62, thereby updating the contents of the identification result integration unit 24. For example, weights of the respective identifiers at the time of integration are updated.

The processing executed by the image registration unit 5 will be described below with reference to FIG. 10. The registered image update unit 61 saves an image obtained from the image input unit 1 in the registered image storing unit 3 (S20). The registered image information acquisition unit 62 obtains some pieces of statistical information such as shooting dates and times or creation dates and times and image resolutions for all images saved in the registered image storing unit 3 (S21). The partial feature evaluation unit 63 judges using these pieces of information whether or not is required to update partial areas (S22). For example, when an image having a newer date and time or an image having a higher resolution is registered, it can be judged that partial areas are required to be updated. If it is judged that the partial areas are required to be updated, the feature vector generation data update unit 64 executes the first update processing for selecting adaptive partial areas used to calculate feature vectors, and updating feature vector generation data (S23). Then, the identification processing evaluation unit 65 judges, using the information obtained by the registered image information acquisition processing (S22), whether or not is required to update the identification unit 23 and identification result integration unit 24 (S24). If it is judged that these units are required to be updated, the identification data update unit 66 executes the second update processing for setting the SVM identifiers included in the identification unit 23 and an integration criterion of the identification result integration unit 24 (S25). The processes from step S21 to step S25 may be executed every time the contents of the registered image storing unit 3 are updated. Alternatively, the processes may be postponed until a predetermined number or more of registered images have been changed. Also, these processes may be executed not only at the update timing of the registered image storing unit 3 but also at the power-ON timing of this apparatus.

<Registered Image Update Processing>

The registered image update unit 61 in FIG. 9 executes one of three processes for transferring an image obtained by the image input unit 1 to the registered image storing unit 3, for deleting an image saved in the registered image storing unit 3, and for replacing an image saved in the registered image storing unit 3 by the obtained image. An instruction that selects one of these processes, and an image which is to undergo the selected process can be input via, for example, an external interface or GUI. An image obtained by the image input unit 1 is appended with an identifier indicating a registered class, to which that image belongs, via an interface, and the number of images to be input at the same time is not limited to one but a plurality of images may be input at the same time.

<Registered Image Information Acquisition Processing>

The registered image information acquisition unit 62 calculates and acquires information for each of images saved in the registered image storing unit 3. At this time, the information that can be acquired is roughly classified into three types of information: information about an individual registered image; statistical information about registered images for each class; and statistical information about all registered images.

As the "information about an individual registered image", in case of an image captured by a digital camera, the registered image information acquisition unit 62 can acquire, for example, an elapsed time since image creation and an image resolution from EXIF information. Furthermore, the identification processing may be preferably applied to registered images. In this case, the identification processing in an initial state without using any adaptive partial areas and SVM identifiers and executing sequential learning, that is, the standard identification processing is executed. Then, a difference between an identifier of a class assigned to a registered image by the registration image update processing (S20) in FIG. 10 and that of a class obtained by the identification processing is calculated, thus calculating a reliability of the standard identification processing. Also, in the edge point detection processing executed by the feature vector extractor 31, likelihoods of the respective detected edge points are obtained. More specifically, reciprocals of differences of edge point positions obtained using a plurality of edge point detection methods such as a method using a convolution neural network and a method using Appearance Matching can be obtained as likelihoods of the edge point detection. Arbitrary edge point detection methods may be used, and known methods can be used.

As the "statistical information about registered images for each class", the registered image information acquisition unit 62 acquires the number of registered images which belong to that class, and a total and average of the pieces of the above information about individual registered images. For example, when identification results of registered images are tallied, identification ratios for respective classes in this object identification apparatus can be obtained.

The "statistical information about all registered images" includes the total number of registered images and the numbers of registered images for respective classes.

Note that the registered image information acquisition unit 62 may calculate invariant information about one registered image when that image is added to the registered image storing unit 3 in FIG. 1A, and may save that information in a storage medium which is prepared separately. However, statistical information such as statistics across classes and all registered images is excluded in this case.

<Partial Feature Evaluation Processing>

The partial feature evaluation unit 63 judges based on the previously selected adaptive partial areas and information which can be obtained from the registered image information acquisition unit 62 whether or not to update the adaptive partial areas based on registered images. As an example of such judgment, that based on shooting dates and times or creation dates and times of registered images will be described. Depending on natures of objects to be identified, their outer appearances may often change as an elapse of time. In such case, since the adaptive partial areas, which were selected based on a registered image obtained at an arbitrary timing, are unlikely to correctly contribute to identification, it is judged that the feature vector generation data update processing is required. As a practical example, when the number of registered images whose times elapsed after they were captured exceed the predetermined number of days exceeds a predetermined ratio to the total number of registered images, it is judged to be necessary that the update processing is executed using only registered images which were captured within the predetermined number of days. At the same time, it is judged that the update processing is skipped only when the number of registered images that can be used in the update processing at that time is equal to or smaller than a predetermined value.

As another example of judgment, that based on similarities on the adaptive partial areas between registered images will be explained. Similarities on the added adaptive partial areas between registered images are calculated. When a similarity of local areas between registered images which belong to an identical class (intra-class) is large, and that of local areas between registered images which belong to different classes (extra-class) is small, a separation degree of the similarities is large. Then, when this separation degree of the similarities is large, the partial areas are effective for identification. Hence, when the separation degree of the similarities on the added adaptive partial areas falls below a predetermined value as a result of updating of registered images, it is judged that the feature vector generation data update processing is required. As a practical definition of the separation degree, the Mahalanobis distance between the similarity distributions of the intra-class and extra-class may be adopted.

<Feature Vector Generation Data Update Processing>

The feature vector generation data update unit 64 selects adaptive partial areas using the registered images saved in the registered image storing unit 3 and the information obtained from the registered image information acquisition unit 62. For example, the sequence when AdaBoost is used will be described below. Differences between the standard and adaptive partial areas are data used in learning, and the sequences are nearly the same. The standard partial areas are selected by executing the AdaBoost method in advance outside the apparatus by giving a variety of and a large number of images as supervisory data. The adaptive partial areas are selected by sequentially executing the AdaBoost method inside the apparatus by giving the registered images as supervisory data. Note that the AdaBoost processing to be described below is roughly associated with a known technique, and a description other than that related to the gist of the present invention will not be given.

Figure 11:
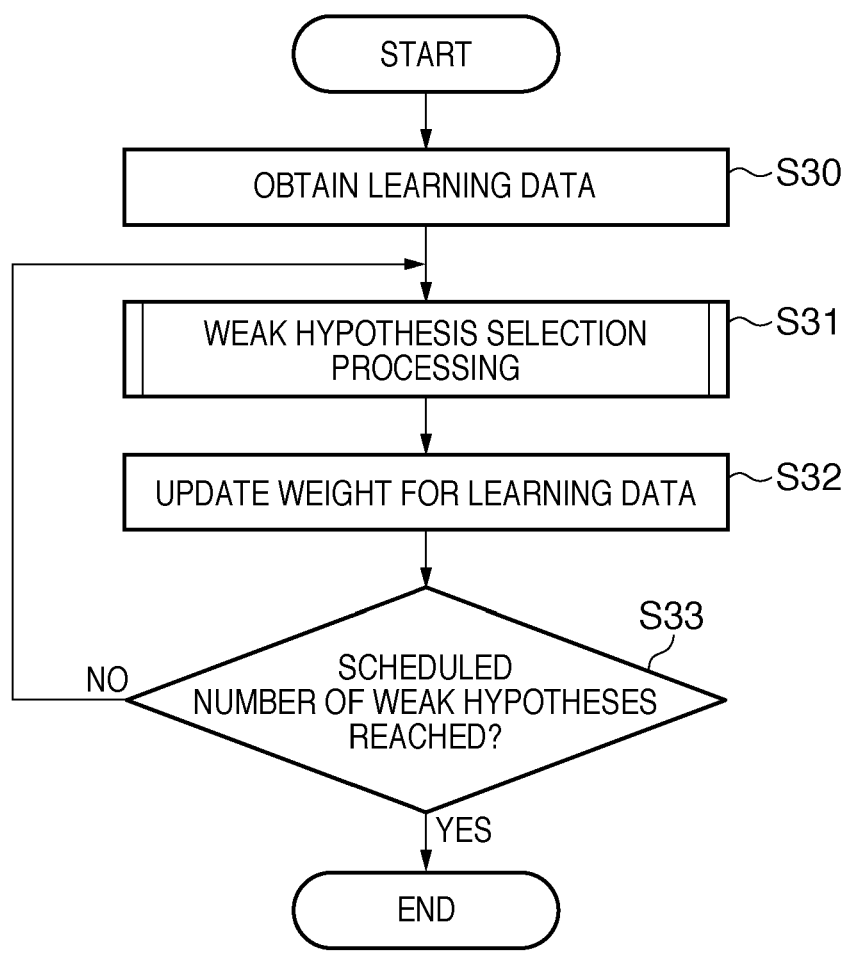
FIG. 11 is a flowchart showing an example of learning processing of partial areas.

FIG. 11 is a flowchart showing an example of partial area learning processing. The feature vector generation data update unit 64 obtains images used as supervisory data (S30). When human faces are to be handled, a large number of images including faces appended with class identifiers are prepared as supervisory data. In this case, it is desirable to prepare a sufficient number of images per person. This is because it is important for learning of partial areas robust against variations of illumination conditions and facial expressions and the feature vector conversion methods to prepare samples including sufficient variations as supervisory data. Next, the feature vector generation data update unit 64 executes weak hypothesis selection processing (S31). In this case, the weak hypothesis is a combination of partial areas and feature vector conversion methods. The feature vector generation data update unit 64 prepares all combinations of face partial area candidates and feature vector conversion methods in advance. Then, the feature vector generation data update unit 64 selects a weak hypothesis of the best performance, that is, a combination of the partial areas and feature vector conversion methods for the supervisory data obtained in step S30 along the AdaBoost framework. As a practical sequence for performance evaluation, the similarity vector calculation processing example described in the paragraphs of the similarity calculation unit 22 may be used. That is, correlation values (inner products) of feature vectors are calculated to generate a similarity vector, which is input to the SVM identifiers. Then, it is determined whether or not correct identification results are obtained between persons of an identical label (images are different) and between persons of different labels, and weighted error rates of the supervisory data are calculated.

After the feature vector generation data update unit 64 selects the weak hypothesis of the best performance, it updates weights for the supervisory data based on the identification results associated with the supervisory data of that weak hypothesis (S32). The feature vector generation data update unit 64 then determines whether or not the number of weak hypotheses reaches a predetermined value (S33). If the number of weak hypotheses has reached the predetermined value (YES in step S33), the learning processing ends. If the number of weak hypotheses has not reached the predetermined value yet (NO in step S33), a new weak hypothesis is selected.

Note that a method described in, for example, [Viola & Jones (2001) "Rapid Object Detection using a Boosted Cascade of Simple Features", Computer Vision and Pattern Recognition.] can be referred to for the detailed learning sequence based on AdaBoost such as the calculation of the weighted error rates and the update method of the weights for the supervisory data. The learning sequence of partial areas used upon generation of feature vectors has been described, and a description will revert to that of the present invention.

In the process of selecting the adaptive partial areas, a problem that a sufficient number of registered images cannot be obtained as supervisory data may be assumed. As an example of a measure against that problem, images are generated by adding variations to the registered images to increase the number of images used as supervisory data. As practical variations, image processing such as addition of noise and rotation using object models can be used. Since known references can be referred to for generation of variation images, a description thereof will not be given.

As another problem, since the AdaBoost method has a heavy calculation load processing, it is often difficult to execute the AdaBoost method inside the apparatus depending on the calculation performance and power supply specifications of the apparatus. As an example of a measure that can eliminate the problem, the number of partial area candidates is limited in advance to reduce the required calculation volume. Upon selecting the standard partial areas, several hundred partial area candidates are prepared. By contrast, upon selecting the adaptive partial areas, several ten partial area candidates are prepared. The several ten partial area candidates themselves may also be selected in advance by the AdaBoost method as in the standard partial areas.

Figure 3:
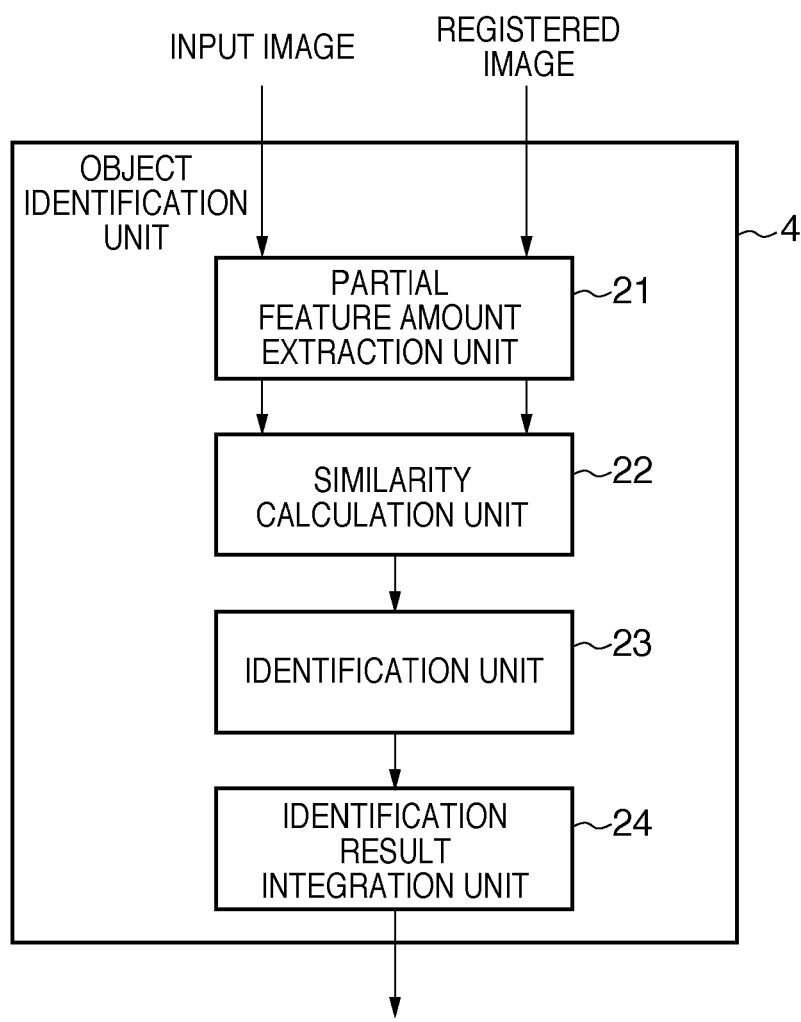
FIG. 3 is a block diagram showing an arrangement example of an object identification unit.

The feature vector generation data update unit 64 combines the selected standard and adaptive partial areas as the partial areas used in the partial feature amount extraction unit 21 shown in FIG. 3. For example, the following combining method is preferably executed. Within a range not more than the number of standard partial areas, a plurality of partial areas which have large likelihoods obtained by the AdaBoost method and are different from the standard partial areas are added to the standard partial areas. Conversely, as for a plurality of partial areas which have small likelihoods and overlap the standard partial areas, the corresponding standard partial areas are set to be unnecessary. Furthermore, weights relative to the standard partial areas are set for the added adaptive partial areas. As the weights, an identical value may be used for all the adaptive partial areas, or different values may be respectively set. Also, as initial values of the weights, typically, the likelihoods obtained by the AdaBoost method may be set.

The number of adaptive partial areas and their weights can be set using, for example, the following criteria based on the registered images and the information obtained by the registered image information acquisition unit 62. It is desirable to decide the number of adaptive partial areas and their weights by combining one or more of the following methods. Note that symbols in equations used in the following setting method examples are defined as follows.

n: the total number of registered images
n[c]: the number of registered images which belong to a registered class c
Nstd: the number of standard partial areas
Nadd: the number of adaptive partial areas to be added
Ndel: the number of standard partial areas to be set as unnecessary areas
W: a weight for an added partial area Assume that Nstd is a constant, and initial values equal to or smaller than Nstd are given to the numbers Nadd and Ndel of adaptive partial areas. Also, it is preferable to set upper limits so that the numbers Nadd and Ndel of adaptive partial areas do not exceed a predetermined ratio of Nstd. In the following setting method examples, the number of adaptive partial areas to be added is the same as that of adaptive partial areas to be set as unnecessary areas, but they may assume different values.

<Adaptive Partial Area Setting Method Based on Total Number of Registered Images>

If the number n of images saved in the registered image storing unit 3 is large, it is assumed that learning has been done using supervisory data including a wider variety of variations accordingly. Therefore, the numbers Nadd' and Ndel' of adaptive partial areas or a weight W' for an adaptive partial area to be added may be increased using:

$$Nadd'=Nadd \times (n \div nmin)(Nadd'=0 \text{ when } n<nmin)$$

$$Ndel'=Ndel \times (n \div nmin)(Ndel'=0 \text{ when } n<nmin)$$

$$W'=W \times (n \div nmin)$$

Alternatively, when the number of registered images is less than a predetermined value nmin, it may be determined that the number of supervisory data is insufficient, and the adaptive partial areas may never be used.

<Adaptive Partial Area Setting Method Based on Identification Processing Result>

Assume that respective registered images have undergone the identification processing in an initial state without using any adaptive partial areas and SVM identifiers and executing sequential learning, that is, the standard identification processing, as described in the registered image information acquisition processing (S21) in FIG. 10, and are appended with class identifiers. At this time, when differences from class identifiers set by the user are calculated in the registered image update processing (S20) in FIG. 10, an identification ratio Rstd of the standard identification processing can be calculated. Therefore, when this identification ratio is lower than a predetermined reference identification ratio Rthr, the numbers Nadd' and Ndel' of adaptive partial areas and a weight W' for them can be increased to compensate for the standard partial areas. This method uses:

$$Nadd' = Nadd \times (Rthr \div Rstd)$$

$$Ndel' = Ndel \times (Rthr \div Rstd)$$

$$W' = W \times (Rthr \div Rstd)$$

<Adaptive Partial Area Setting Method Based on Edge Point Detection Result>

Figure 5:
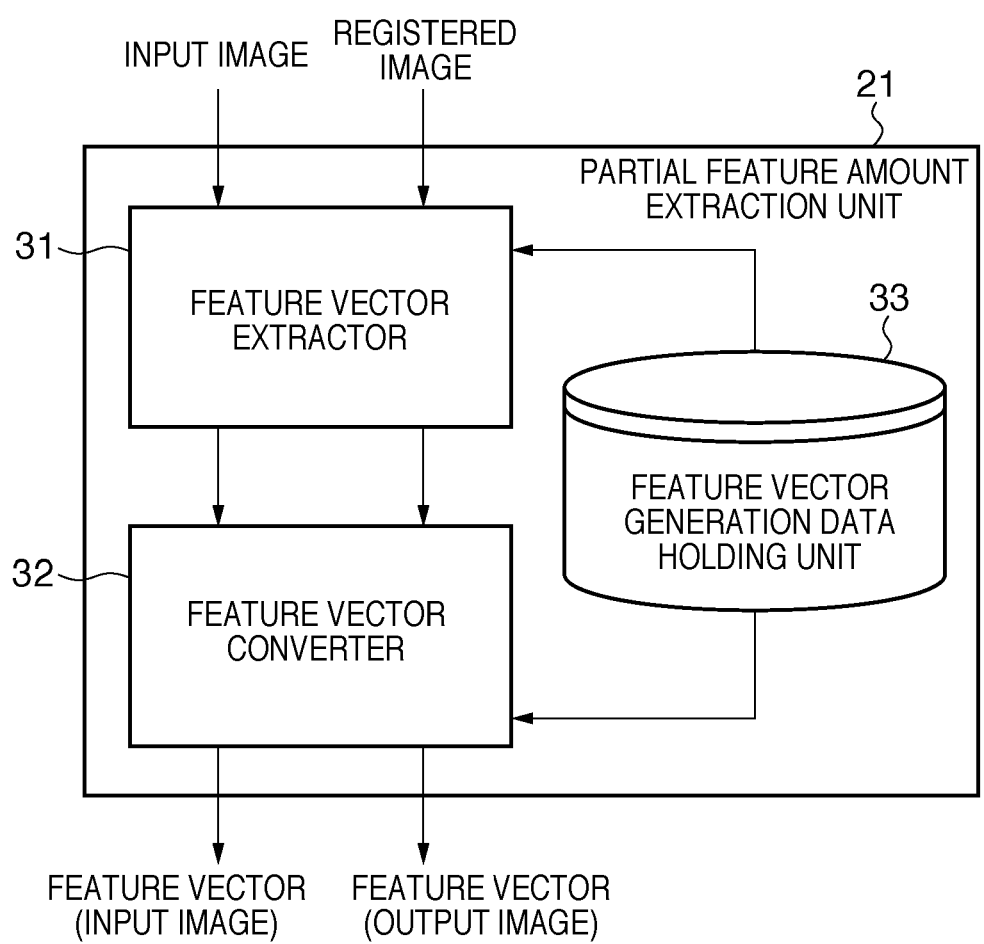
FIG. 5 is a block diagram showing an arrangement example of a partial feature amount extraction unit.

When the edge point detection processing to be executed by the feature vector extractor 31 in FIG. 5 has been done, the likelihoods of the respective edge points can be obtained, as described above. When likelihoods for a certain edge point of respective registered images are averaged, an average likelihood for that edge point can be calculated. When such average likelihoods for all edge points are averaged, an average likelihood of the edge point detection in the registered images is calculated. The magnitude of the average likelihood of the edge point detection in the registered images affords a clue to judgment as to whether or not objects are included in input images to have postures suited to identification in the registered images, that is, whether or not input images are effective images as the registered images. According to the magnitude of the average likelihood of the edge point detection in the registered images, the numbers of adaptive partial areas and weight can be increased. Letting Astd be a reference of an edge point detection likelihood and Aavg be the average likelihood of the edge point detection, the numbers of adaptive partial areas and weight can be calculated using:

$$Nadd' = Nadd \times (Aavg \div Astd)$$

$$Ndel' = Ndel \times (Aavg \div Astd)$$

$$W' = W \times (Aavg \div Astd)$$

At an edge point having a high average likelihood, an edge point is likely to be detected to have a small error from an input image. Therefore, for a partial area whose position is determined with reference to an edge point having a high average likelihood, its weight is preferably increased. Letting A[i] be a detected likelihood at a certain edge point i, an updated value W[i]' of a weight W[i] of a local area i whose position is determined with reference to that edge point can be calculated by:

$$W[i]' = W[i] \times (A[i] \div Astd)$$

The feature vector generation data update processing has been described. The identification unit evaluation processing will be described below.

<Identification Unit Evaluation Processing>

The identification processing evaluation unit 65 judges based on the information that can be obtained from the registered image information acquisition unit 62 whether or not to update the adaptive input image identification unit and whether or not to update the criterion used upon integration of the output values of the standard and adaptive SVM identifiers.

As a judgment example, the identification ratio of registered images will be described below. Respective registered images undergo the identification processing shown in FIG. 4 to estimate class identifiers. Also, class identifiers, which are estimated using only the standard partial features and identifier, and those set by the user are obtained from the registered image information acquisition unit 62. Next, from the information of the identifiers, an identification ratio when only the standard partial features and identifier and that of the current identification processing are calculated. When the identification ratio of the current identification processing falls below or nearly equal to that when only the standard partial features and identifier are used as a result of updating of registered images, it is judged that the SVM identifier update processing is required. That is, the identification processing evaluation unit 65 judges whether or not to require identification data update processing based on the magnitude relationship between the identification ratio using only the standard identifier and that using the standard and adaptive identifiers.

As another criterion of judgment, shooting dates and times of registered images can be used as in the partial feature evaluation unit 63 shown in FIG. 9. However, a description thereof will not be given.

<Identification Data Update Processing>

The identification data update unit 66 trains the adaptive SVM identifiers using the registered images saved in the registered image storing unit 3 and the information that can be obtained from the registered image information acquisition unit 62 as in the processing of the feature vector generation data update unit 64. Then, the identification data update unit 66 sets an integration criterion of the output values of the standard and adaptive SVM identifiers.

Figure 12:
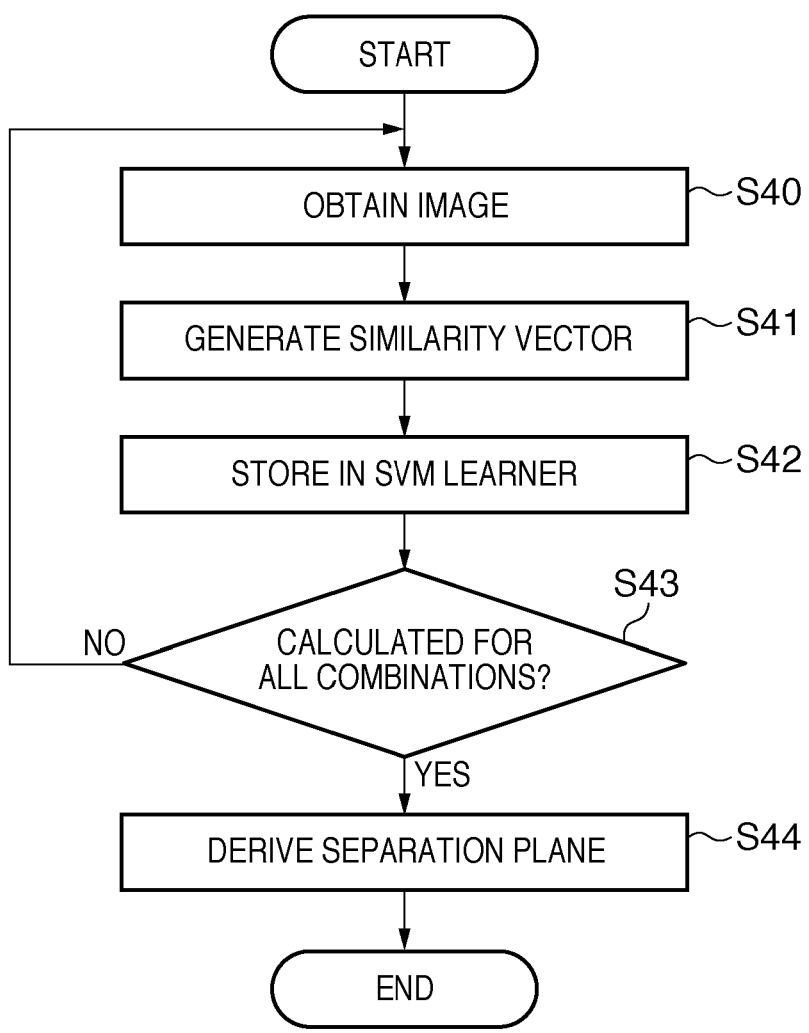
FIG. 12 is a flowchart showing an example of learning processing of an SVM identifier.

Initially, the adaptive SVM identifiers are trained. Differences between the standard and adaptive SVM identifiers lay in supervisory data and learning timings, and the same learning sequence can be used. The learning of the standard SVM identifier is complete in advance outside the apparatus by giving a large number of images as supervisory data, while sequential re-learning of the adaptive SVM identifiers is executed inside the apparatus by giving registered images as supervisory data. The learning sequence of the SVM identifiers by the identification data update unit 66 will be described below with reference to FIG. 12.

The identification data update unit 66 obtains images used as supervisory data (S40). When human faces are to be handled, a large number of images including faces appended with labels that represent individual identifiers are prepared as supervisory data. Next, the identification data update unit 66 extracts two out of these images, and generates a similarity vector by the method described in the paragraphs of the partial feature amount extraction unit 21 and similarity calculation unit 22 (S41). Subsequently, the identification data update unit 66 gives the similarity vector to an SVM learner together with a label which represents whether the similarity vector is an intra-class or extra-class similarity (S42). The identification data update unit 66 determines whether or not the processes in steps S41 and S42 have been executed for all combinations of obtained images (S43). If it is determined that the processes are complete, the identification data update unit 66 derives a hypersurface (separation plane) which separates the intra-class and extra-class similarity vectors on a similarity vector space (S44). The sequence for training the SVM identifiers has been described. Note that the processing described above is roughly associated with known techniques, and some descriptions are appropriately not given. As the adaptive SVM identifiers, an SVM identifier which does not require re-learning from an initial state and sequentially learns using only added supervisory data can be used. As for this sequential learning type SVM, please refer to a known reference such as [G. Cauwenberghs & T. Poggio (2001) "Incremental and decremental support vector machine Learning", In Advances in Neural Information Processing Systems].

The identification data update unit 66 generates corresponding adaptive SVM identifiers, as many as the number of registered classes. When the number of registered classes is increased based on the processing result of the registered image update unit 61, adaptive SVM identifiers are added in correspondence with an increment of the number of registered classes; when the number of registered classes is decreased, adaptive SVM identifiers corresponding to the deleted classes are discarded.

In order to train an adaptive SVM identifier corresponding to a certain class, similarity vectors obtained between registered images which belong to that class as intra-class supervisory data, and similarity vectors obtained between registered images which belong to that class and those which belong to other classes as extra-class supervisory data are respectively given to a SVM learner.

Next, the identification result integration unit 24 sets weights upon integrating the output values of the standard and adaptive SVM identifiers. Different weights may be respectively set for the adaptive SVM identifiers or the same weight may be used for all the identifiers. For example, the following weight setting methods are available, and it is desirable to decide a weight by combining one or more of the following methods. Note that symbols in equations used in the following setting methods are defined as follows. Also, please refer to the definitions in the aforementioned partial feature evaluation processing. Assume that an initial value is given to rstd in advance, and a lower limit may be set for rstd so as not to become zero.

rstd: a contribution ratio of Ostd to a final output value
rada: a contribution ratio of Oada to a final output value (1.0−rstd)
Ostd: an output value of a standard SVM identifier
Oada: an output value of an adaptive SVM identifier
Ofin: a final output value obtained by integrating output values of the standard and adaptive SVM identifiers $$Ofin = Ostd \times rstd + Oada \times rada$$

<Adaptive SVM Identifier Weight Setting Method Based on Number of Registered Images>

When the number n of registered images is large, it is assumed that learning has been done using supervisory data including a wider variety of variations accordingly. Therefore, the weight rada for the adaptive SVM identifier is preferably set to be large. Alternatively, when n falls below a reference nmin of the number of registered images, the weight rada for the output value of the adaptive SVM identifier is set to be zero, that is, the weight rada is not used. A weight rada' can be calculated, for example, using:

$$rada' = rada \times (n \div nmin)(rada' = 0 \text{ when } n < nmin)$$

Alternatively, different weights may be calculated for respective registered classes. Letting n[c] be the number of registered images which belong to a certain class, and nminc be a reference of the number of registered images which belong to one class, an updated value rada[c]' of a weight rada[c] of an output value from an adaptive SVM identifier corresponding to that class can be calculated by:

$$rada[c]' = rada[c] \times (n[c] \div nminc)$$

<Adaptive SVM Identifier Weight Setting Method Based on Identification Processing Result>

Assume that respective registered images have undergone the identification processing in an initial state without using any adaptive partial areas and SVM identifiers and executing sequential learning, that is, the standard identification processing, as described in the registered image information acquisition processing (S21), and are appended with class identifiers. At this time, when differences from class identifiers set by the user are calculated in the registered image update processing (S20), an identification ratio Rstd of the standard identification processing can be calculated. Therefore, when this identification ratio is low, the weight rada is preferably increased to compensate for the adaptive SVM identifier. For example, the weight rada' can be set using a predetermined reference identification ratio Rthr by:

$$rada' = rada \times (Rthr \div Rstd)$$

Alternatively, different weights may be calculated for respective registered classes as in the above method. Letting Rstd[c] be an identification ratio of the standard identification processing for a certain class c, an updated value rada[c]' of a weight rada[c] of an output value from an adaptive SVM identifier corresponding to that class can be calculated by:

$$rada[c]' = rada[c] \times (Rthr[c] \div Rstd)$$

The processing for re-learning the adaptive SVM identifier has been described. Parameters associated with separation planes of the respective SVM identifiers are transferred to the SVM identifier data holding unit 42, and the weight used upon integrating the output values is transferred to the integration data holding unit 52 shown in FIG. 8.

As described above, according to the first embodiment, the identification performance for a specific object to be identified can be improved while suppressing deterioration of the identification performance due to over-learning.

Second Embodiment

In the first embodiment, identical adaptive partial areas are set for an input image and a registered image at the time of identification processing independently of a registered class to which a registered image to be compared with the input image belongs. By contrast, the second embodiment is different from the first embodiment in that different adaptive partial areas are selected for respective registered classes. The second embodiment will be described below. Note that a description of the same parts as in the above embodiment will not be given in the following description, so as to avoid redundant explanations. Since the basic functions of the respective units are the same as the first embodiment, please refer to the first embodiment for the descriptions of the respective units.

<Feature Vector Generation Data Update Processing>

Differences from the first embodiment will be explained below in association with a feature vector generation data update unit 64 in an image registration unit 5 shown in FIG. 9. In the first embodiment, weak hypothesis selection processing (S31) to weight update processing (S32) are executed using all combinations of registered images as supervisory data upon calculating adaptive partial areas by the AdaBoost method shown in FIG. 11. As a result, one set of adaptive partial areas having high identification performance of registered classes on the average is selected. A partial feature amount extraction unit 21 sets partial areas which are obtained by adding and deleting partial areas to standard partial areas using identical adaptive partial areas independently of input images and registered images to be compared.

By contrast, in the second embodiment, for each registered class, adaptive partial areas which can enhance the identification performance of that registered class are selected. That is, sets of adaptive partial areas are selected as many as the number of registered classes. When a registered image which belongs to a certain registered class is compared with an input image, the partial feature amount extraction unit 21 shown in FIG. 3 adds and deletes partial areas to and from standard partial areas using adaptive partial areas corresponding to that registered class. Then, the feature amount extraction unit 21 sets the partial areas that have undergone addition and deletion in the input image and registered image.

Upon selecting adaptive partial areas corresponding to a certain registered class by the AdaBoost method, the following combinations are used as supervisory data in place of all combinations of registered images to be used as supervisory data. That is, combinations of registered images which belong to a target class and those of registered images which belong to the target class and registered images which belong to other classes are used. Combinations of registered images which belong to non-target classes are excluded from supervisory data.

As described above, according to the second embodiment, since different adaptive partial areas are selected for respective classes, appropriate partial areas can be selected for respective classes in addition to the effects of the first embodiment.

Third Embodiment

In the first embodiment, adaptive partial areas are decided by machine learning based on the AdaBoost method. By contrast, the third image generates an average image of an object outside the apparatus in advance, and the average image is compared with registered images to select adaptive partial areas. The third embodiment will be described in detail below. Note that a description of the same parts as in the first embodiment will not be given in the following description, so as to avoid redundant explanations. Since the basic functions of the respective units are the same as the first embodiment, please refer to the first embodiment for the descriptions of the respective units.

<Average Feature Amount Generation Processing>

Figure 13:
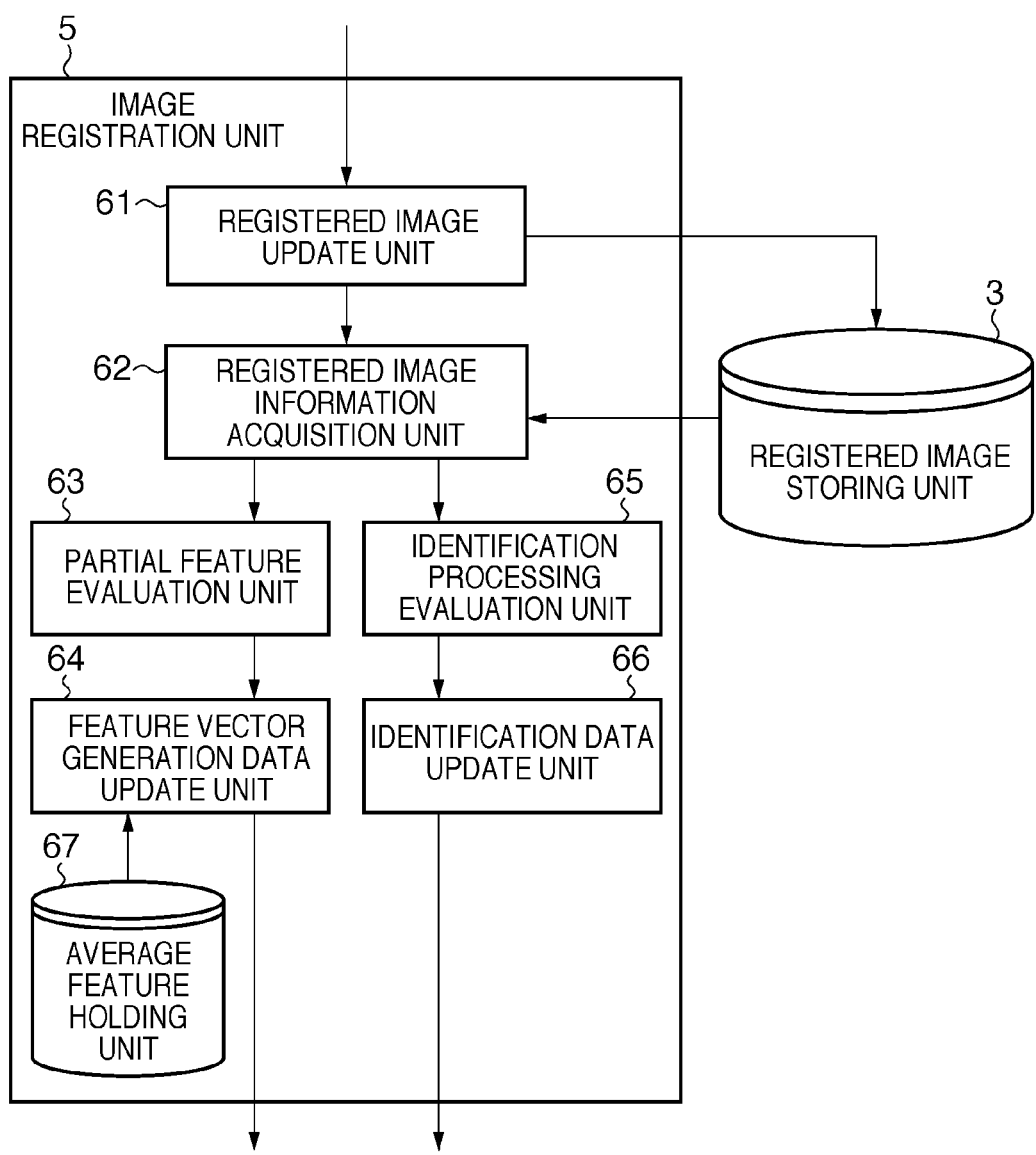
FIG. 13 is a block diagram showing an arrangement example of an image registration unit according to the third embodiment.

An image registration unit 5 according to the third embodiment will be described below with reference to FIG. 13. As a difference of the image registration unit 5 of the third embodiment from the first embodiment, an average feature holding unit 67 is added, and a feature vector generation data update unit 64 refers to this unit. The average feature holding unit 67 holds average values of partial feature amounts (average feature amounts) of predetermined partial feature candidates. It is desired to generate these average feature amounts in advance by giving sufficient quantities of supervisory data outside the apparatus. Average feature amount generation processing when image partial areas are used as partial features will be described below as in the first embodiment. However, average partial feature amounts can be generated from every type of partial features.

The average feature holding unit 67 applies partial feature amount extraction processing, which has been described in association with the feature amount extraction unit 21, to all predetermined partial area candidates in input images used as given average feature amount generation data. By averaging all partial feature amounts obtained by this processing in association with all the images, the average feature amounts of the respective partial area candidates can be obtained. The averaging timing in the feature amount extraction unit 21 can be arbitrarily set. For example, extracted partial areas of images, which have undergone filter calculations to extract luminance values, or those obtained by compressing the partial areas that have undergone the filter calculations using, for example, PCA, can be averaged. Note that in terms of the calculation volumes in feature vector generation data update processing (to be described later), feature vectors whose data sizes are most reduced and which are obtained by reducing dimensions using, for example, PCA may be averaged between images used as supervisory data and may be stored in the average feature holding unit 67.

<Feature Vector Generation Data Update Processing>

The feature vector generation data update unit 64 of the third embodiment selects adaptive partial areas and their weights using registered images saved in a registered image storing unit 3, information that can be obtained from a registered image information acquisition unit 62, and the average feature amounts held in the average feature holding unit 67.

The feature vector generation data update unit 64 applies feature amount extraction processing, which is the same as that applied to images used as supervisory data in the average feature amount generation processing, to respective registered images, and extracts partial feature amounts from predetermined partial area candidates. The feature vector generation data update unit 64 then decides weights respectively for the predetermined partial area candidates based on the feature amounts of the registered images and the average feature amounts. As the method of selecting the weights and the number of adaptive partial features in this embodiment, the following setting methods can be used to select them in addition to the setting methods described in the feature vector generation data update processing of the first embodiment. It is preferable to decide the number of adaptive partial areas and weights by combining one or more of these methods.

<Partial Area Candidate Weight Setting Method Based on Difference from Average Feature Amount>

A difference between the average feature amount and a feature amount obtained from a registered image is calculated for a certain partial area candidate p. This difference is calculated for all registered images which belong to a certain class c, thus obtaining an intra-class difference average da[p][c]. By averaging the intra-class difference averages by all registered classes, a difference average da[p] is obtained. The magnitude of this intra-class difference average is a criterion about how characteristic in this partial area candidate an object of a certain class is in comparison to an average object. When a partial area candidate whose intra-class difference average da[p][c] is remarkably larger than the difference average da[p], for example, a partial area candidate serving as a marker such as a mole unique to an individual in a face image, is positively used, the identification performance of the class c may be improved. Therefore, a weight W[p]' of the partial area candidate which serves as a marker can be increased by evaluating the partial area candidate using the following equation. Since the reliability of the difference average increases as the number n[c] of registered images which belong to that class is larger, a weight W[p] may be increased by the following equation using a reference nminc of the number of registered images which belong to one class. Note that as for symbols in the equations, please also refer to the definitions in the partial feature evaluation processing in the first embodiment.

$$W[p]'=W[p]\times(\mathrm{da}[p][c]\div\mathrm{da}[p])\times(n[c]\div n\mathrm{minc})$$

<Partial Area Candidate Weight Setting Method Based on Difference Between Identical Class Registered Images>

A difference between feature amounts obtained from registered images which belong to a certain identical class c is calculated for a certain partial area candidate p. This difference is obtained from all combinations of registered images which belong to that class, and the obtained differences are averaged to obtain a self difference average da[p][c]. The magnitude of this self difference average is a criterion that represents changes of an object of a certain class in this partial area candidate p. A partial area candidate having the large self difference average includes, for example, the eyes that change largely depending on facial expressions and hair which has large changes along with an elapse of time in face images. By positively using a partial area candidate which has the small difference average, that is, which is hard to change in an identical object, the identification performance may be improved. Therefore, the weights for the partial area candidates having the smaller difference averages in registered images which belong to a certain class may be set to be larger with decreasing difference average. At the same time, since the reliability of the difference average can be improved as the number of registered images which belong to that class is larger, the weights for the partial area candidates having the smaller difference averages may be set to be large. For example, the weight W[p] can be changed by:

$$W[p]' = W[p] \times (d[p][c] \div d) \times (n[c] \div nminc)$$

where d is an average of the self difference averages by all registered classes and all partial area candidates.

Note that the differences in the above setting methods may have arbitrary definitions. For example, the difference is preferably calculated within a range from 0.0 to 1.0 using inner products of vectors. The third embodiment has been described.

Fourth Embodiment

The fourth embodiment is different from the first embodiment in an identification unit included in an object identification unit 4 and processing contents of an identification data update unit included in an image registration unit 5. In the first embodiment, an output from an adaptively configured SVM identifier is combined to that of a standard SVM identifier in the form of a linear sum, and a weight of the linear sum is sequentially updated based on registered images which are added as needed. By contrast, in the fourth embodiment, the standard SVM identifier and adaptive SVM identifier are allocated in series, and are driven in turn. When an output value of the standard SVM identifier does not exceed a certain threshold, processing is aborted at that time. When the output value exceeds the threshold, a class to which an input image belongs is discriminated based on an output value of the adaptive SVM identifier. The threshold is updated by the identification data update unit. The fourth embodiment will be described in detail below. Note that a description of the same parts as in the first embodiment will not be given in the following description, so as to avoid redundant explanations. Since the basic functions of the respective units are the same as the first embodiment, please refer to the first embodiment for the descriptions of the respective units.

<Identification Processing>

Figure 7B:
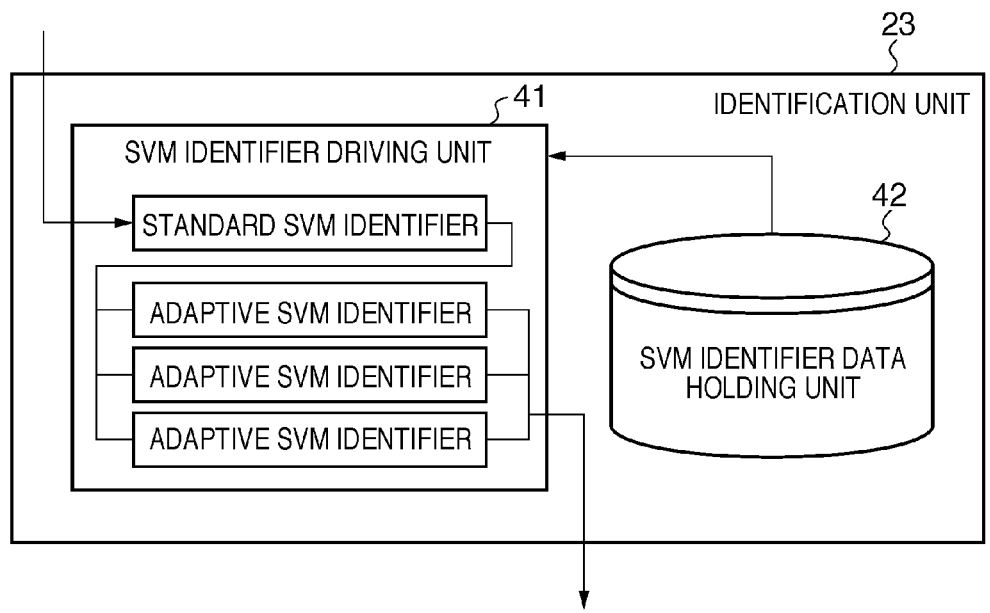

A difference of the identification unit in the object identification unit 4 from the first embodiment will be described below. A case will be described below wherein a two-class problem of an intra-class and extra-class is determined using SVM identifiers as in the first embodiment. FIG. 7B is a block diagram showing an arrangement example of an identification unit 23 in the object identification unit 4. The identification unit 23 includes an SVM identifier driving unit 41 and SVM identifier data holding unit 42. The natures of standard and adaptive SVM identifiers used in the SVM identifier driving unit 41 and the number of adaptive SVM identifiers which is equal to the number of registered classes are the same as in the first embodiment. However, the method of connecting the SVM identifiers in the SVM identifier driving unit 41 is partially different, and the SVM identifiers are connected not in parallel but in series. The identification unit 23 identifies similarity vectors between an input image and registered images in the following sequence.

The SVM identifier driving unit 41 inputs only components corresponding to standard partial areas, as well as unnecessary standard partial areas and those which are not unnecessary areas, of a similarity vector to the standard SVM identifier. At this time, when a real value output from the standard SVM identifier does not exceed a predetermined threshold, processing is aborted since it is determined that the input image does not belong to a class to which this registered image belongs. When the real value exceeds the threshold, the SVM identifier driving unit 41 subsequently inputs all the components of the similarity vector to the adaptive SVM identifier corresponding to the class to which the registered image belongs, and outputs an obtained output value to an identification result integration unit 24. A difference in the subsequent processing of the identification result integration unit 24 from the first embodiment is as follows. That is, upon completion of the identification processing for all registered images, a class of the input image is always set as that to which a registered image corresponding to the largest output of the adaptive SVM identifier belongs, and a message indicating no corresponding registered class is not output. The sequence for deciding the threshold will be described in the following paragraphs of the identification data update unit.

<Identification Data Update Processing>

A difference of an identification data update unit 66 (FIG. 9) in the image registration unit 5 from the first embodiment will be described below. As in the first embodiment, the adaptive SVM identifier is updated using registered images saved in a registered image storing unit 3 and information which can be obtained from a registered image information acquisition unit 62. Since this learning of the adaptive SVM identifier is the same as that in the first embodiment, a description thereof will not be repeated.

Subsequently, in the first embodiment, a weight used upon outputting the output values of the standard and adaptive SVM identifiers as a linear sum is calculated. In this embodiment, the threshold for the output value of the standard SVM identifier is calculated. Assume that an initial value is set for the threshold in advance. In identification data update processing, a different threshold Th[c] for each class c may be decided or the same threshold Th for all the registered classes may be decided. For example, the following threshold deciding methods are available, and it is preferable to decide a threshold by combining one or more of the following methods. Note that as for symbols in equations described in the setting methods, the definitions in the partial feature evaluation processing in the first embodiment are to be referred to together.

<Adaptive SVM Identifier Threshold Setting Method Based on Number of Registered Images>

When the number of registered images which belong to a certain class is larger, it is assumed that the adaptive SVM identifier corresponding to that class has been trained using supervisory data including a wider variety of variations accordingly, and the performance that the adaptive SVM identifier identifies a similarity to that class is improved. Therefore, a threshold Th[c] upon identifying variations to that class by the standard SVM identifier may be lowered to commit identification to the adaptive SVM identifier. Alternatively, when the number n[c] of registered images which belong to a certain class falls below a predetermined value, a method in which the adaptive SVM identifier corresponding to that class is not used may be adopted. In place of the number of registered images for each class, a threshold Th may be uniformly increased/decreased for all classes depending on the magnitude of the total number n of registered images.

$$Th[c]'=Th[c]\times(n\min c \div n[c])(Th[c]'=0 \text{ when } n[c] < n\min c)$$

$$Th'=Th\times(n\min \div n)(Th'=0 \text{ when } n<n\min)$$

<Adaptive SVM Identifier Threshold Setting Method Based on Identification Processing Result>

Assume that respective registered images have undergone the identification processing in an initial state without using any adaptive partial areas and SVM identifiers and executing sequential learning, that is, the standard identification processing, as described in the registered image information acquisition processing (S21), and are appended with class identifiers. At this time, when differences from class identifiers obtained from the user are calculated in the registered image update processing (S20), an identification ratio of the standard identification processing can be calculated for each class. If an identification ratio Rstd[c] of the standard SVM identifier is low with respect to a certain class, the threshold Th[c] upon identifying variations to that class by the standard SVM identifier is lowered to commit identification to the adaptive SVM identifier.

$$Th[c]'=Th[c]\times(R\text{std}[c] \div R\text{thr})$$

The processing for re-trailing the adaptive SVM identifiers has been described. Then, parameters of the adaptive SVM identifiers corresponding to respective classes and the threshold are transferred to the SVM identifier data holding unit 42. The fourth embodiment has been described.

Fifth Embodiment

The fifth embodiment is different from the first embodiment in that not only registered images but also supervisory images which are held in advance in an apparatus are used together as supervisory data used by a feature vector extractor and identification data update unit. The fifth embodiment will be described in detail below. Note that a description of the same parts as in the first embodiment will not be given in the following description, so as to avoid redundant explanations. Since the basic functions of the respective units are the same as the first embodiment, please refer to the first embodiment for the descriptions of the respective units.

Figure 1B:
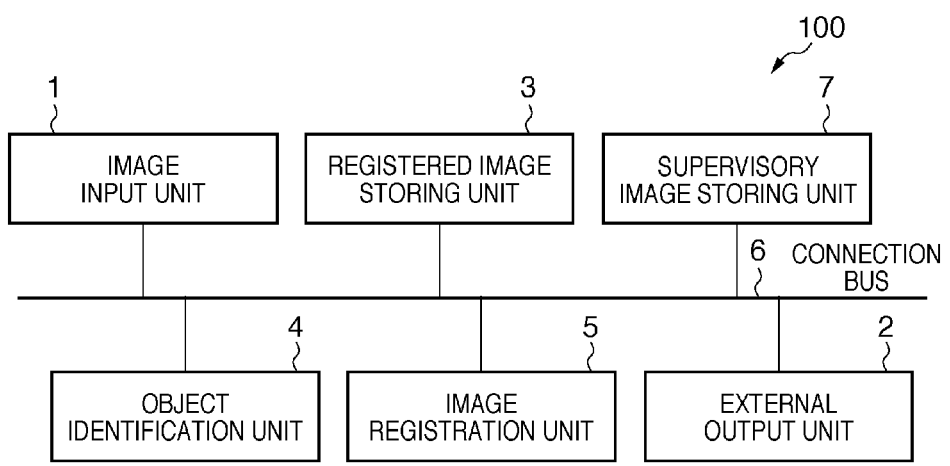
Figure 14:
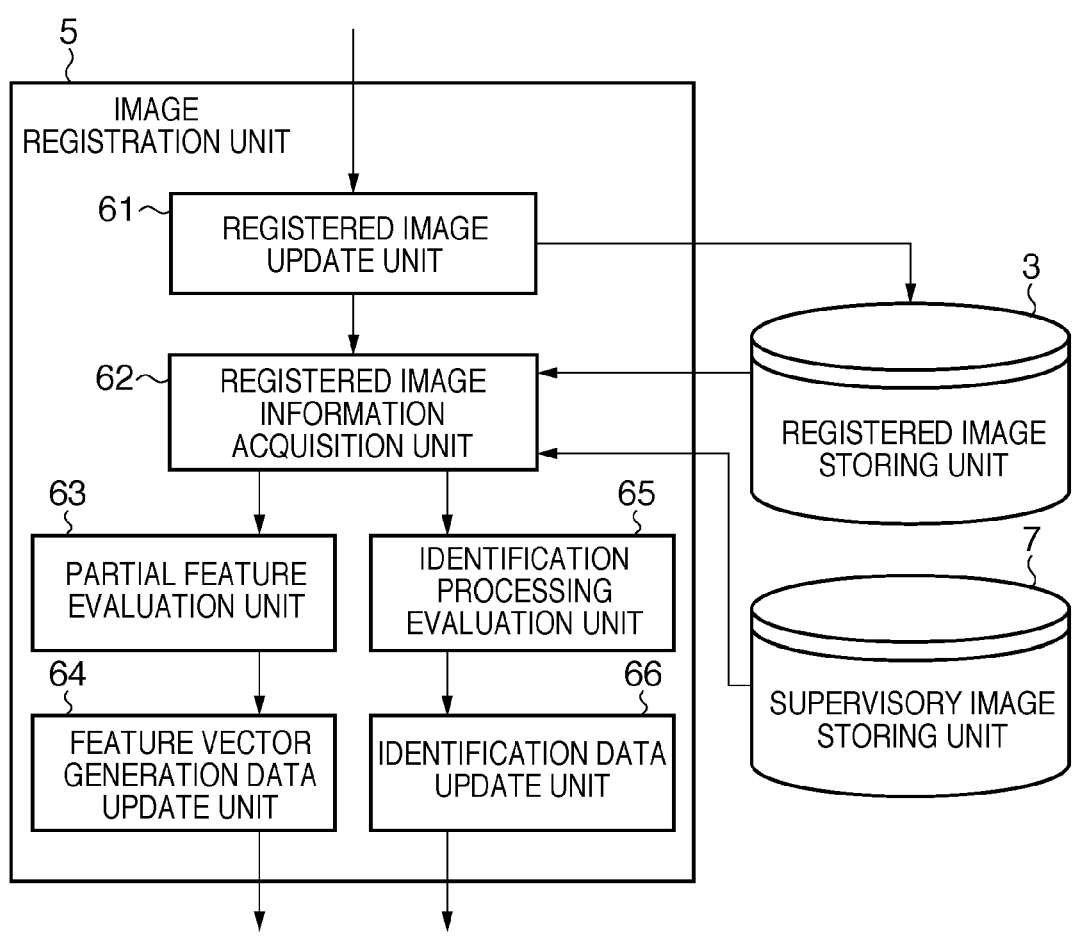
FIG. 14 is a block diagram showing an arrangement example of an image registration unit according to the fifth embodiment.

FIG. 1B shows an entire hardware arrangement example of an object identification apparatus 100 according to the fifth embodiment. Also, FIG. 14 shows an arrangement example of an image registration unit 5 of the fifth embodiment. The fifth embodiment is different from the first embodiment in that a supervisory image storing unit 7 is added. The supervisory image storing unit 7 saves a large number of object images which can be used as supervisory data, and the saved supervisory images do not belong to any of registered classes. The user adds, deletes, and replaces registered images, but the supervisory images do not require such operations.

As in the first to fourth embodiments, when learning of adaptive partial areas and an adaptive SVM identifier is executed using only registered images, the number of registered images is too small to obtain a sufficient learning result. Since all registered images are object images which belong to any of classes, and object images which do not belong to any of classes cannot be used in learning, the learning of the adaptive partial areas and adaptive SVM identifier, which are extremely specialized to the registered images, may be executed. In this embodiment, processes in a registered image information acquisition unit 62, feature vector generation data update unit 64, and identification data update unit 66 use not only images registered in a registered image storing unit 3 but also supervisory images stored in the supervisory image storing unit 7 together.

According to the present invention, the identification performance for a specific object to be identified can be improved while suppressing deterioration of the identification performance due to over-learning which may occur upon updating a sequential learning type identifier.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298819, filed Dec. 28, 2009, which is hereby incorporated by reference herein in its entirety.

What is claimed is:

1. An object identification apparatus which identifies a class of a plurality of registered classes to which an object in an input image belongs, comprising:

a storage unit configured to store a plurality of registered images used in identification of the object in the input image;

a holding unit configured to hold designation data to designate partial areas used in identification;

an identification unit configured to extract feature amounts of the partial areas designated by the designation data from the input image and each of the plurality of registered images, and to identify a class to which the object in the input image belongs based on the extracted feature amounts;

a registration unit configured to register a new image in said storage unit;

a determination unit configured to determine based on the plurality of registered images stored in said storage unit whether or not to update processing to be performed by said identification unit, if the new image has been registered by said registration unit; and an update unit configured to update, when said determination unit determines that the processing is to be updated, the designation data held by said holding unit based on the registered images stored in said storage unit, wherein said identification unit comprises:

a standard identifier in which parameters are set by learning using a plurality of supervisory images;

adaptive identifiers for respective classes, in each of which parameters are set using registered images registered in said storage unit;

a calculation unit configured to calculate a first identification ratio using only the standard identifier and a second identification ratio using both of the standard identifier and an adaptive identifier;

a parameter update determination unit configured to determine whether or not to update the parameters, based on a magnitude relationship between the first identification ratio and the second identification ratio; and a parameter update unit configured to update, when said parameter update determination unit determines that parameters are to be updated, the parameters based on registered images registered in said storage unit.

2. The apparatus according to claim 1, wherein said identification unit further comprises:

an acquisition unit configured to acquire a similarity vector based on feature amounts of the input image and a registered image;

a discrimination unit configured to discriminate using a similarity vector acquired by said acquisition unit for each of the plurality of registered images whether or not the input image belongs to a class to which the registered image belongs; and an integration unit configured to generate an identification result by integrating a plurality of discrimination results by said discrimination unit for the plurality of registered images, wherein said parameter update determination unit further determines whether or not to update the parameters used in said integration unit, and said parameter update unit further updates, when said parameter update determination unit determines that parameters used in said integration unit are to be updated, the parameters based on registered images registered in said storage unit.

3. The apparatus according to claim 2, further comprising:

a supervisory image storing unit configured to store the plurality of supervisory images, wherein said update unit and said parameter update unit execute update processing using supervisory images held in said supervisory image storing unit when the number of registered images in said storage unit is insufficient.

4. The apparatus according to claim 1, wherein said determination unit determines, based on creation dates and times of the plurality of registered images, whether or not to update the designation data.

5. The apparatus according to claim 1, wherein said determination unit determines whether or not to update the designation data, based on a separation degree as a ratio of similarities between registered images of an identical class to similarities between registered images of different classes in association with partial areas designated by the designation data.

6. The apparatus according to claim 1, wherein said parameter update unit updates a separation plane in the standard identifier and the adaptive identifier.

7. The apparatus according to claim 1, wherein said parameter update unit updates a weight used when identification results of the standard identifier and the adaptive identifier are integrated.

8. The apparatus according to claim 1, wherein the partial areas used in identification remain the same independently of classes.

9. The apparatus according to claim 1, wherein the partial areas used in identification are different for respective classes.

10. The apparatus according to claim 1, further comprising:

an average feature holding unit configured to hold average values of feature amounts of the partial areas calculated using a plurality of supervisory images, wherein said update unit updates weight values for the partial areas using average values of feature amounts of partial areas calculated using registered images which belong to an identical class, and the average values of the corresponding partial areas held in said average feature holding unit.

11. The apparatus according to claim 1, wherein the standard identifier and the adaptive identifiers are connected in parallel, and said integration unit integrates identification results obtained from the standard identifier and the adaptive identifiers.

12. The apparatus according to claim 1, wherein the standard identifier and the adaptive identifiers are connected in series, and said integration unit integrates identification results obtained from the adaptive identifiers.

13. The apparatus according to claim 12, wherein the adaptive identifier executes processing only when an identification result of the standard identifier exceeds a threshold, and said parameter update unit updates the threshold.

14. The apparatus according to claim 13, wherein the adaptive identifiers are arranged for the respective classes, and different thresholds are set for the respective classes.

15. A control method of an object identification apparatus, which comprises:

a storage unit configured to store a plurality of registered images used in identification of an object in an input image; and a holding unit configured to hold designation data to designate partial areas used in identification, and which identifies a class of a plurality of registered classes to which the object included in the input image belongs, the control method comprising:

an identification step of an identification unit extracting feature amounts of the partial areas designated by the designation data from the input image and each of the plurality of registered images, and identifying a class to which the object in the input image belongs based on the extracted feature amounts;

a registration step of registering a new image in the storage unit;

a determination step of determining based on the plurality of registered images stored in the storage unit whether or not to update processing to be performed in the identification step, if the new image has been registered in the registration step; and an update step of updating, when it is determined in the determination step that the processing is to be updated, the designation data based on the registered images stored in the storage unit, wherein said identification unit comprises:

a standard identifier in which parameters are set by learning using a plurality of supervisory images; and adaptive identifiers for respective classes, in each of which parameters are set using registered images registered in said storage unit, and wherein said identification step further comprises:

a calculation step of calculating a first identification ratio using only the standard identifier and a second identification ratio using both of the standard identifier and an adaptive identifier;

a parameter update determination step of determining whether or not to update the parameters, based on a magnitude relationship between the first identification ratio and the second identification ratio, and a parameter update step of updating, when said parameter update determination step determines that parameters are to be updated, the parameters based on registered images registered in said storage unit.

16. A non-transitory computer-readable storage medium storing computer executable code of a computer program for controlling a computer to execute a control method of an object identification apparatus which comprises a storage unit configured to store a plurality of registered images used in identification of the object in the input image, and a holding unit configured to hold designation data to designate partial areas used in identification, the code, when executed, causing the computer to perform:

an identification step of an identification unit extracting feature amounts of partial areas designated by the designation data held from an input image and each of a plurality of registered images, and identifying a class to which the object in the input image belongs based on the extracted feature amounts;

a registration step of registering a new image in the storage unit;

a determination step of determining based on the plurality of registered images stored in the storage unit whether or not to update processing to be performed in the identification step, if the new image has been registered in the registration step; and an update step of updating, when it is determined in the determination step that the processing is to be updated, the designation data based on the registered images stored in the storage unit, wherein said identification unit comprises:

a standard identifier in which parameters are set by learning using a plurality of supervisory images; and adaptive identifiers for respective classes, in each of which parameters are set using registered images registered in said storage unit, and wherein said identification step further comprises:

a calculation step of calculating a first identification ratio using only the standard identifier and a second identification ratio using both of the standard identifier and an adaptive identifier;

a parameter update determination step of determining whether or not to update the parameters, based on a magnitude relationship between the first identification ratio and the second identification ratio, and a parameter update step of updating, when said parameter update determination step determines that parameters are to be updated, the parameters based on registered images registered in said storage unit.

* * * * *